United States Patent
Jung et al.

(10) Patent No.: US 8,027,396 B2
(45) Date of Patent: Sep. 27, 2011

(54) APPARATUS AND METHOD FOR TRANSMITTING AND RECEIVING A SIGNAL IN A MULTIPLE INPUT MULTIPLE OUTPUT MOBILE COMMUNICATION SYSTEM

(75) Inventors: Young-Ho Jung, Suwon-si (KR); Myeon-Kyun Cho, Seongnam-si (KR); Jin-Gon Joung, Seoul (KR); Yong-Hoon Lee, Daejeon (KR)

(73) Assignees: Samsung Electronics Co., Ltd., Suwon-si (KR); Korea Advanced Institute of Science and Technology, Daejon (KR)

( * ) Notice: Subject to any disclaimer, the term of this patent is extended or adjusted under 35 U.S.C. 154(b) by 941 days.

(21) Appl. No.: 12/005,992

(22) Filed: Dec. 28, 2007

(65) Prior Publication Data

US 2008/0159426 A1 Jul. 3, 2008

(30) Foreign Application Priority Data

Jan. 2, 2007 (KR) .................. 10-2007-0000175

(51) Int. Cl.
*H04L 27/04* (2006.01)
(52) U.S. Cl. .................. 375/260; 375/267; 375/295
(58) Field of Classification Search .................. 375/260, 375/267, 295; 714/786, 794, 795; 455/59; 370/69.1
See application file for complete search history.

(56) References Cited

U.S. PATENT DOCUMENTS

| | | | |
|---|---|---|---|
| 7,149,254 B2 | 12/2006 | Sampath | |
| 7,298,717 B2* | 11/2007 | Hui et al. | 370/329 |
| 7,668,077 B2* | 2/2010 | Wu et al. | 370/208 |
| 2005/0157809 A1 | 7/2005 | Yuk | |
| 2006/0176993 A1* | 8/2006 | Kwun et al. | 375/367 |
| 2008/0056414 A1* | 3/2008 | Kim et al. | 375/347 |
| 2009/0003485 A1* | 1/2009 | Li et al. | 375/299 |
| 2009/0117862 A1 | 5/2009 | Le Nir et al. | |
| 2009/0296844 A1 | 12/2009 | Ihm et al. | |
| 2010/0027696 A1* | 2/2010 | Lee et al. | 375/260 |

FOREIGN PATENT DOCUMENTS

| | | |
|---|---|---|
| KR | 1020050076675 A | 7/2005 |
| KR | 1020060038812 A | 5/2006 |
| KR | 1020060130062 A | 12/2006 |

\* cited by examiner

*Primary Examiner* — Shuwang Liu
*Assistant Examiner* — Helene Tayong

(57) ABSTRACT

Disclosed is an apparatus and a method for signal transmission and reception according to a pre-processing scheme in a MIMO mobile communication system. The method includes: inputting a symbol; and pre-processing the input symbol according to a pre-processing matrix corresponding to pre-processing matrix information and transmitting the pre-processed symbol through a corresponding transmission antenna, wherein the pre-processing matrix is determined in accordance with a number of transmission antennas and a rate used in the MIMO mobile communication system.

8 Claims, 7 Drawing Sheets

APPARATUS AND METHOD FOR TRANSMITTING AND RECEIVING A SIGNAL IN A MULTIPLE INPUT MULTIPLE OUTPUT MOBILE COMMUNICATION SYSTEM

CROSS-REFERENCE TO RELATED APPLICATION(S) AND CLAIM OF PRIORITY

This application claims the priority under 35 U.S.C. §119(a) to a Korean Patent Application filed in the Korean Intellectual Property Office on Jan. 2, 2007 and assigned Serial No. 2007-175 the contents of which are hereby incorporated by reference.

TECHNICAL FIELD OF THE INVENTION

The present invention relates to an apparatus and a method for signal transmission and reception in a mobile communication system, and more particularly to an apparatus and a method signal transmission and reception in a mobile communication system (MIMO mobile communication system) using a Multiple Input Multiple Output (MIMO) scheme.

BACKGROUND OF THE INVENTION

In general, next-generation communication systems are developing in pursuit of a system capable of providing a service allowing high-speed large-capacity data transmission and reception to Mobile Stations (MSs). However, different from wire channel environments, wireless channel environments of mobile communication systems undergo occurrence of inevitable errors, which cause loss of information, due to various factors, such as multi-path interference, shadowing, electric wave attenuation, time-varying noise, and interference and fading.

The loss of information may cause severe distortion of an actual transmission signal, thereby degrading the entire mobile communication system performance. Therefore, a diversity scheme is used in order to eliminate the instability of communication due to the fading. In large, the diversity scheme can be classified into a time diversity scheme, a frequency diversity scheme, and an antenna diversity scheme, that is, a space diversity scheme.

The antenna diversity scheme is a scheme using multiple antennas and can be classified into a reception antenna diversity scheme using multiple reception antennas, a transmission antenna diversity scheme using multiple transmission antennas, and a Multiple Input Multiple Output (MIMO) diversity scheme using multiple reception antennas and multiple transmission antennas. The MIMO scheme is a kind of Space-Time Coding (STC) scheme. According to the STC scheme, signals encoded according to a predetermined encoding scheme are transmitted through multiple transmission antennas, so that an encoding scheme of a time domain is expanded to a space domain, so as to achieve a lower error rate.

A representative of such MIMO schemes is a Double Space Time Transmit Diversity (DSTTD) scheme. In a mobile communication system using the DSTTD scheme (DSTTD mobile communication system), two independent data streams are encoded by using two Space Time Block Coding (STBC) encoders before transmission, so as to simultaneously acquire both multiplexing and diversity gain. In the DSTTD mobile communication system, because multiple antennas are used, the spatial correlation between antennas has an influence on the entire system performance. Therefore, in the DSTTD mobile communication system, antenna grouping is performed by using an antenna grouping matrix in order to solve the problem of spatial correlation. Hereinafter, a method for antenna grouping using an antenna grouping matrix will be described with reference to FIGS. 1 and 2.

FIG. 1 is a block diagram illustrating a structure of a signal transmission apparatus of a typical DSTTD mobile communication system.

Referring to FIG. 1, the signal transmission apparatus includes a serial to parallel (S/P) converter 111, STBC encoders 113-1 and 113-2, an antenna grouping unit 115, and transmission antennas 117-1, 117-2, 117-3, and 117-4.

First, when a transmission data stream X to be transmitted occurs, the transmission data stream X is input to the S/P converter 111. Then, the S/P converter 111 converts the transmission data stream X into two parallel sub-transmission data streams $x_1x_2$ and $x_3x_4$, and then outputs the sub-transmission data stream $x_1x_2$ to the STBC encoder #1 113-1 and the sub-transmission data stream $x_3x_4$ to the STBC encoder #2 113-2.

The STBC encoder #1 113-1 encodes the sub-transmission data stream $x_1x_2$ according to the STBC scheme and then outputs the encoded sub-transmission data stream $x_1x_2$ to the antenna grouping unit 115. Further, the STBC encoder #1 113-2 encodes the sub-transmission data stream $x_3x_4$ according to the STBC scheme and then outputs the encoded sub-transmission data stream $x_3x_4$ to the antenna grouping unit 115. Then, the antenna grouping unit 115 receives the signals output from the STBC encoder #1 113-1 and the STBC encoder #2 113-2, performs antenna grouping based on antenna grouping matrix information, and transmits the antenna-grouped signals through corresponding transmission antennas during two symbol periods.

Since FIG. 1 corresponds to an example using the STBC scheme, the antenna grouping unit 115 performs antenna grouping and then transmits the antenna-grouped signals through corresponding transmission antennas during two symbol periods. However, in the case where the signal transmission apparatus uses a Space Frequency Block Coding (SFBC) scheme as well as the STBC scheme, the antenna grouping unit 115 may perform antenna grouping and then transmit the antenna-grouped signals through corresponding transmission antennas during one symbol period. For example, when the signal transmission apparatus uses an Orthogonal Frequency Division Multiplexing (OFDM) scheme, the antenna grouping unit 115 may, after performing the antenna grouping, transmit the antenna-grouped signals through corresponding transmission antennas and through two adjacent sub-carriers during one symbol period. Here, the antenna grouping matrix information is received through a receiver (not shown) from a signal reception apparatus corresponding to the signal transmission apparatus. The antenna grouping matrix information will be described below with reference to FIG. 2.

FIG. 2 is a block diagram illustrating a structure of a signal reception apparatus of a typical DSTTD mobile communication system.

Referring to FIG. 2, the signal reception apparatus includes reception antennas 211-1 and 211-2, a DSTTD receiver 213, and an antenna grouping matrix information generator 215. First, a signal received through the reception antennas 211-1 and 211-2 is input to the DSTTD receiver 213. Then, the DSTTD receiver 213 estimates the signal received through the reception antennas 211-1 and 211-2 as a transmission data stream X by using a Vertical Bell Laboratories lAyered Space Time (V-BLAST) scheme based on a Minimum Mean Square Error (MMSE) scheme or a Zero Forcing (ZF) scheme.

Further, the DSTTD receiver 213 performs channel estimation for the signal received through the reception antennas 211-1 and 211-2, and then outputs a result of the channel estimation to the antenna grouping matrix information generator 215. The antenna grouping matrix information generator 215 generates antenna grouping matrix information in accordance with the channel estimation result output from the DSTTD receiver 213, and then transmits the generated antenna grouping matrix information to the signal transmission apparatus. Hereinafter, an operation of generating the antenna grouping matrix information by the antenna grouping matrix information generator 215 will be described.

The antenna grouping matrix information generated by the antenna grouping matrix information generator 215 include three bits, because the DSTTD mobile communication systems uses six antenna grouping matrixes. The antenna grouping matrix information generator 215 may select an antenna grouping matrix for minimizing the spatial correlation in accordance with the channel estimation result, an antenna grouping matrix for minimizing the Mean Square Error (MSE), or an antenna grouping matrix for maximizing the smaller Signal to Noise Ratio (SNR) from among the SNRs of the two sub-transmission data streams. The antenna grouping matrix can be defined by equation (1) below.

$$\chi_0 = \left\{ \begin{bmatrix} 1 & 0 & 0 & 0 \\ 0 & 1 & 0 & 0 \\ 0 & 0 & 1 & 0 \\ 0 & 0 & 0 & 1 \end{bmatrix}_{k=1} \begin{bmatrix} 1 & 0 & 0 & 0 \\ 0 & 1 & 0 & 0 \\ 0 & 0 & 0 & 1 \\ 0 & 0 & 1 & 0 \end{bmatrix}_{k=2} \begin{bmatrix} 1 & 0 & 0 & 0 \\ 0 & 0 & 1 & 0 \\ 0 & 1 & 0 & 0 \\ 0 & 0 & 0 & 1 \end{bmatrix}_{k=3} \begin{bmatrix} 1 & 0 & 0 & 0 \\ 0 & 0 & 0 & 1 \\ 0 & 1 & 0 & 0 \\ 0 & 0 & 1 & 0 \end{bmatrix}_{k=4} \right.$$

$$\left. \begin{bmatrix} 1 & 0 & 0 & 0 \\ 0 & 0 & 1 & 0 \\ 0 & 0 & 0 & 1 \\ 0 & 1 & 0 & 0 \end{bmatrix}_{k=5} \begin{bmatrix} 1 & 0 & 0 & 0 \\ 0 & 0 & 0 & 1 \\ 0 & 0 & 1 & 0 \\ 0 & 1 & 0 & 0 \end{bmatrix}_{k=6} \right\} \quad (1)$$

In equation (1), $\chi_0$ refers to an antenna grouping matrix set, and k denotes an antenna grouping matrix index. Further, each row of each antenna grouping matrix is mapped to the transmission antenna index, and each column thereof is mapped to an input index of the antenna grouping unit 115. As noted from equation (1), each antenna grouping matrix included in the antenna grouping matrix set $\chi_0$ has a configuration in which every transmission antenna transmits one data stream. However, such a configuration of the antenna grouping matrix in which every transmission antenna transmits one data stream cannot solve the problem of spatial correlation of the transmission antennas.

SUMMARY OF THE INVENTION

To address the above-discussed deficiencies of the prior art, it is a primary object of the present invention to solve the above-mentioned problems occurring in the prior art, and the present invention provides an apparatus and a method for signal transmission and reception in a Multiple Input Multiple Output (MIMO) mobile communication system.

Also, the present invention provides an apparatus and a method for signal transmission and reception according to a pre-processing scheme in a MIMO mobile communication system.

In accordance with an aspect of the present invention, there is provided a method for transmitting a signal by a signal transmission apparatus in a MIMO mobile communication system, the method including the steps of: inputting a symbol; and pre-processing the input symbol according to a pre-processing matrix corresponding to pre-processing matrix information and transmitting the pre-processed symbol through a corresponding transmission antenna, wherein the pre-processing matrix is determined in accordance with a number of transmission antennas and a rate used in the MIMO mobile communication system.

In accordance with another aspect of the present invention, there is provided a method for receiving a signal by a signal reception apparatus in a MIMO mobile communication system, the method including the steps of: performing channel estimation for an incoming signal; and generating pre-processing matrix information that indicates information on a pre-processing matrix to be used by a signal transmission apparatus corresponding to the signal reception apparatus in accordance with a result of the channel estimation, wherein the pre-processing matrix is determined in accordance with a number of transmission antennas and a rate used in the MIMO mobile communication system.

In accordance with another aspect of the present invention, there is provided a signal transmission apparatus of a MIMO mobile communication system, the signal transmission apparatus including: transmission antennas; and a pre-processing unit for pre-processing an input symbol according to a pre-processing matrix corresponding to pre-processing matrix information and transmitting the pre-processed symbol through a corresponding transmission antenna, wherein the pre-processing matrix is determined in accordance with the number of the transmission antennas and a rate used in the MIMO mobile communication system.

In accordance with another aspect of the present invention, there is provided a signal reception apparatus of a MIMO mobile communication system, the signal reception apparatus including: a pre-processing information generator for generating pre-processing matrix information that indicates information on a pre-processing matrix to be used by a signal transmission apparatus corresponding to the signal reception apparatus in accordance with a result of channel estimation for an incoming signal, wherein the pre-processing matrix is determined in accordance with a number of transmission antennas and a rate used in the MIMO mobile communication system.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, exemplary embodiments of the present invention will be described with reference to the accompanying drawings. In the following description, a detailed description of known functions and configurations incorporated herein will be omitted when it may make the subject matter of the present invention rather unclear.

The present invention proposes an apparatus and a method for signal transmission and reception according to a pre-processing scheme in a MIMO mobile communication system using a Multiple Input Multiple Output (MIMO) scheme. Further, the present invention proposes an apparatus and a method for signal transmission and reception while minimizing overhead of a MIMO mobile communication system and minimizing the number of bits included in pre-processing matrix information in the MIMO mobile communication system.

Figure 1:
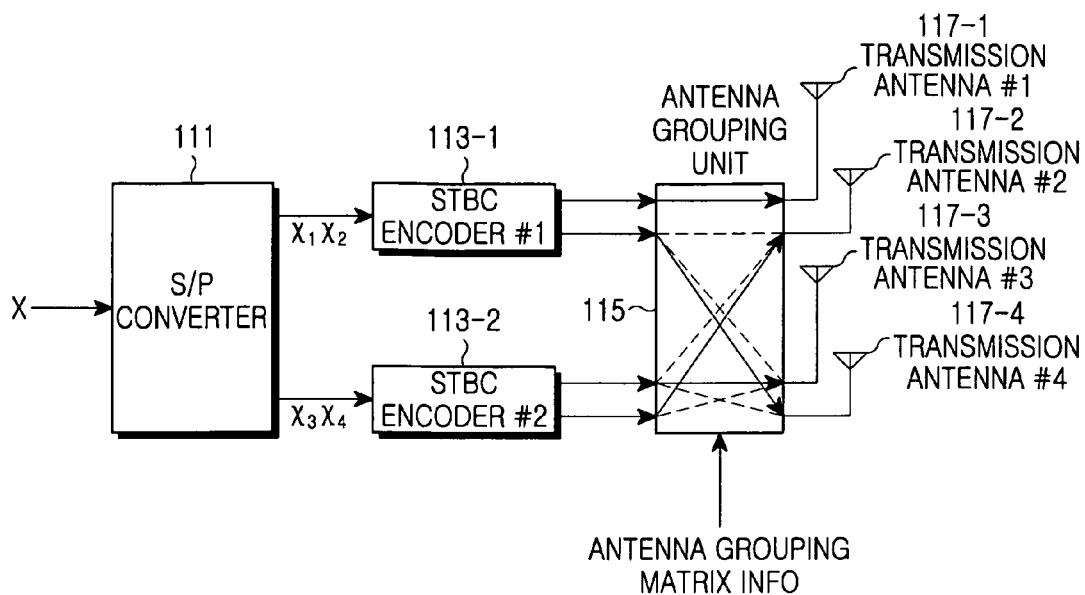
FIG. 1 is a block diagram illustrating a structure of a signal transmission apparatus of a typical DSTTD mobile communication system.
Figure 2:
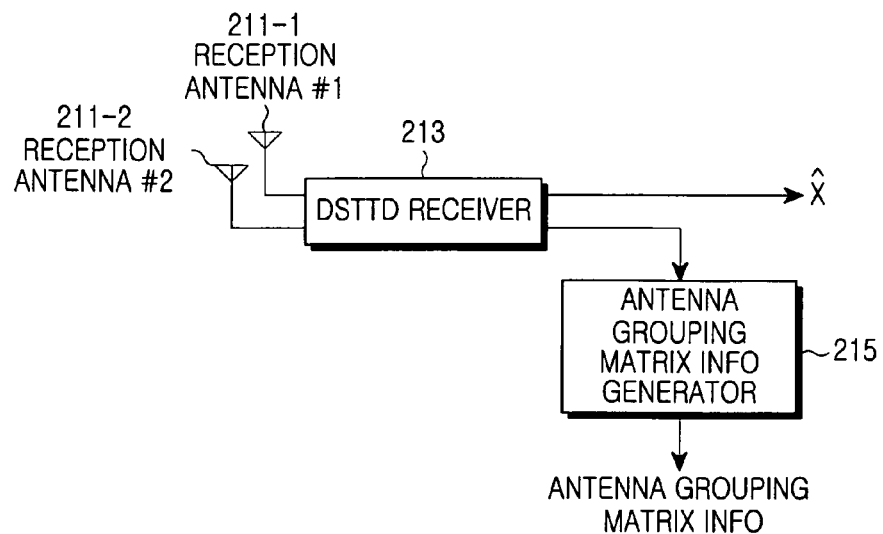
FIG. 2 is a block diagram illustrating a structure of a signal reception apparatus of a typical DSTTD mobile communication system.
Figure 3:
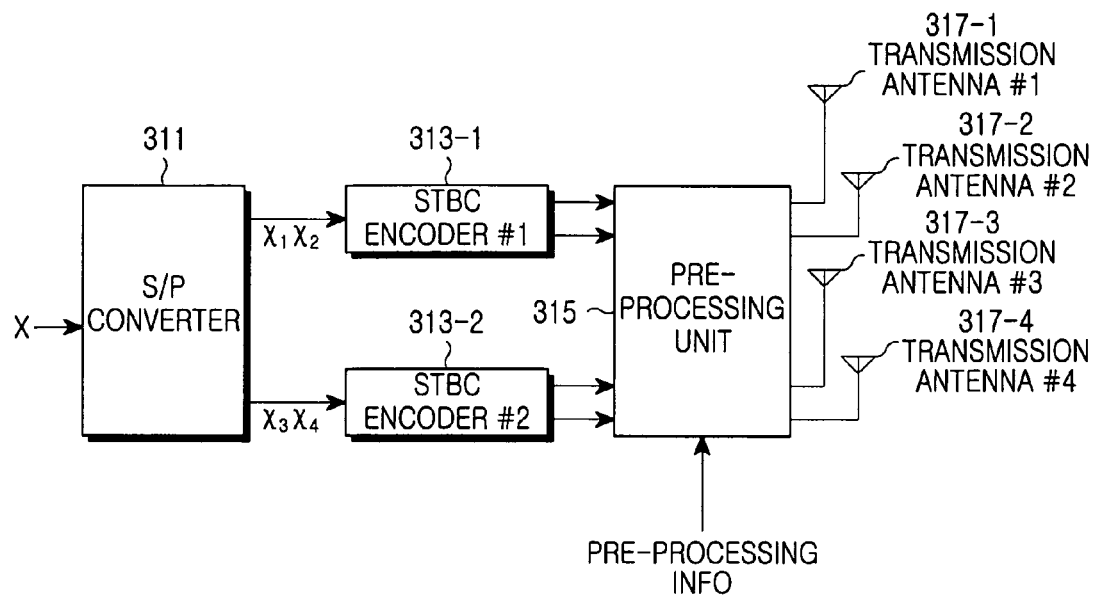
FIG. 3 is a block diagram illustrating a signal transmission apparatus using four transmission antennas and a rate having a value of 2 in a MIMO mobile communication system according to an embodiment of the present invention.

FIG. 3 is a block diagram illustrating a signal transmission apparatus using four transmission antennas and a rate having a value of 2 in a MIMO mobile communication system according to an embodiment of the present invention.

Referring to FIG. 3, the signal transmission apparatus includes a Serial-to-Parallel (S/P) converter 311, Space Time Block Coding (STBC) encoders 313-1 and 313-2, a pre-processing unit 315, and transmission antennas 317-1, 317-2, 317-3, and 317-4. First, when a transmission data stream X to be transmitted occurs, the transmission data stream X is input to the S/P converter 311. The transmission data stream X is defined by $X=[X_1 X_2 X_3 X_4]^T$, and includes 24 (i.e., 4!) permutations.

Then, the S/P converter 311 rearranges the transmission data stream X by using a predetermined permutation as shown in equation (2) below, thereby generating a rearranged transmission data stream $\tilde{X}_i$, wherein i denotes a permutation index. That is, the permutation index i indicates an index of a corresponding permutation from among the 24 permutations included in the transmission data stream X.

$$\tilde{X}_i = [x_l x_m x_n x_o]^T \qquad (2)$$

In equation (2), $l \neq m \neq n \neq o$, and $l, m, n, o \in \{1,2,3,4\}$.

The S/P converter 311 converts the transmission data stream $\tilde{X}_i$ into two parallel sub-transmission data streams, and then outputs the two generated sub-transmission data streams to corresponding STBC encoders.

The STBC encoders encode the input sub-transmission data streams according to the STBC scheme and then output the encoded sub-transmission data streams to the pre-processing unit 315. Then, the pre-processing unit 315 converts the signals output from the STBC encoders 313-1 and 313-2 into a serial signal, thereby generating a Double Space Time Transmit Diversity (DSTTD) symbol $S_i$ as defined by equation (3) below. Hereinafter, for convenience of description, a signal output from each of the STBC encoders 313-1 and 313-2 is referred to as an "STBC symbol."

$$S_i = \begin{bmatrix} x_1 & -x_2^* \\ x_2 & x_1^* \\ x_3 & -x_4^* \\ x_4 & x_3^* \end{bmatrix}, S_2 = \begin{bmatrix} x_1 & -x_3^* \\ x_3 & x_1^* \\ x_2 & -x_4^* \\ x_4 & x_2^* \end{bmatrix}, \ldots, S_{24} = \begin{bmatrix} x_4 & -x_3^* \\ x_3 & x_4^* \\ x_2 & -x_1^* \\ x_1 & x_2^* \end{bmatrix} \qquad (3)$$

As noted from equation (3), 24 types of DSTTD symbols $S_i$ can be generated, because 24 types of rearranged transmission data streams $\tilde{X}_i$ can be generated.

Hereinafter, a signal transmitted through a corresponding transmission antenna during two symbol periods from the pre-processing unit 315 is referred to as a "final transmission symbol." Further, the 4×4 pre-processing matrix $W_k$ (wherein k indicates a pre-processing matrix index) can be defined by equation (4) below.

$$W_k \in \chi = \{W_1, \ldots, W_K\} \qquad (4)$$

In equation (4), $\chi$ indicates a pre-processing matrix set including K pre-processing matrixes.

Meanwhile, the pre-processing matrix information is received through a receiver (not shown) from a signal reception apparatus corresponding to the signal transmission apparatus. The pre-processing matrix information is described below with reference to FIG. 4.

Figure 4:
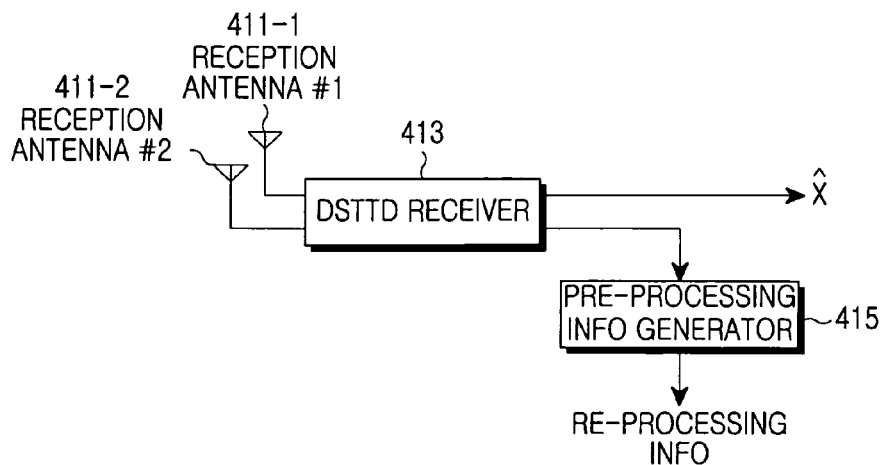
FIG. 4 is a block diagram illustrating a signal reception apparatus using four transmission antennas and a rate having a value of 2 in a MIMO mobile communication system according to an embodiment of the present invention.

FIG. 4 is a block diagram illustrating a signal reception apparatus using four transmission antennas and a rate having a value of 2 in a MIMO mobile communication system according to an embodiment of the present invention.

Referring to FIG. 4, the signal reception apparatus includes reception antennas 411-1 and 411-2, a DSTTD receiver 413, and a pre-processing matrix information generator 415. First, a signal received through the reception antennas 411-1 and 411-2 is input to the DSTTD receiver 413. Then, the DSTTD receiver 413 estimates the signal received through the reception antennas 411-1 and 411-2 as a transmission data stream $\hat{X}$ by using a maximum likelihood receiver based on a V-BLAST scheme, or a linear decoder based on an MMSE scheme or a ZF scheme.

Further, the DSTTD receiver 413 performs channel estimation for the signal received through the reception antennas 411-1 and 411-2, and then outputs a result of the channel estimation to the pre-processing matrix information generator 415. The pre-processing matrix information generator 415 generates pre-processing matrix information in accordance with the channel estimation result, and then transmits the generated pre-processing matrix information to the signal transmission apparatus through a transmitter (not shown). Hereinafter, an operation of generating the pre-processing matrix information by the pre-processing matrix information generator 415 will be described.

First, when the signal transmission apparatus uses four transmission antennas and the signal reception apparatus uses two reception antennas, a MIMO channel H between the signal transmission apparatus and the signal reception apparatus can be defined by equation (5) below.

$$H = \begin{bmatrix} h_{1,1} & h_{1,2} & h_{1,3} & h_{1,4} \\ h_{2,1} & h_{2,2} & h_{2,3} & h_{2,4} \end{bmatrix} \quad (5)$$

In equation (5), $h_{i,j}$ indicates a complex channel gain between the $j^{th}$ transmission antenna and the $i^{th}$ reception antenna. A signal reception model through a MIMO channel as defined by equation (5) can be defined by equation (6) below.

$$\begin{bmatrix} y_1(1) & y_1(2) \\ y_2(1) & y_2(2) \end{bmatrix} = HW_k S_i + \begin{bmatrix} n_1(1) & n_1(2) \\ n_2(1) & n_2(2) \end{bmatrix} \quad (6)$$

In equation (6), the channel matrix H is defined by $H = R_R^{1/2} H R_T^{1/2}$, wherein $R_T$ refers to a 4×4 complex matrix indicating a correlation matrix of the transmission antenna, $R_R$ refers to a 2×2 complex matrix indicating a correlation matrix of the reception antenna, and elements of the 2×4 complex matrix H are independently identically distributed (hereinafter, referred to as "i.i.d.") Gaussian probability variables having an average of 0 and a dispersion of 1. Further, in equation (6), $n_j(t)$ indicates thermal noise of the $j^{th}$ reception antenna during symbol time t and has an i.i.d. Gaussian distribution that has an average of 0 and a dispersion of $N_0$.

In other words, a reception signal as defined by equation (6) is input to the DSTTD receiver 413, and the DSTTD receiver 413 estimates the input reception signal as a transmission data stream $\hat{X}$ by using a maximum likelihood receiver, V-BLAST scheme, or a linear decoder based on a MMSE scheme or a ZF scheme.

Meanwhile, equation (6) can be changed to equation (7) below.

$$[y_1(1)\ y^*_1(2)\ y_{(2)}(1)\ y^*_2(2)]^T = E_k \tilde{x}_i + [n_1(1)\ n^*_1(2)\ n_2(1)\ n^*_2(2)]^T \quad (7)$$

In this case, an effective channel matrix $E_k$ reflecting the STBC scheme and the pre-processing matrix $W_k$ can be defined by equation (8) below.

$$E_k = \begin{bmatrix} h_1^T W_{k,1} + h_2^T W_{k,3} & h_1^T W_{k,2} + h_2^T W_{k,4} \\ (h_1^H W_{k,1} + h_2^H W_{k,3})J & (h_1^H W_{k,2} + h_2^H W_{k,4})J \\ h_3^T W_{k,1} + h_4^T W_{k,3} & h_3^T W_{k,2} + h_4^T W_{k,4} \\ (h_3^H W_{k,1} + h_4^H W_{k,3})J & (h_3^H W_{k,2} + h_4^H W_{k,4})J \end{bmatrix} \quad (8)$$

In equation (8), $h_1^T = [h_{1,1}\ h_{1,2}]$, $h_2^T = [h_{1,3}\ h_{1,4}]$, $h_3^T = [h_{2,1}\ h_{2,2}]$, and $h_4^T = [h_{2,3}\ h_{2,4}]$. Further, in equation (8), $$J = \begin{bmatrix} 0 & -1 \\ 1 & 0 \end{bmatrix} \text{ and } W_k = \begin{bmatrix} W_{k,1} & W_{k,2} \\ W_{k,3} & W_{k,4} \end{bmatrix}.$$

When the DSTTD receiver 413 performs linear wave detection by using the effective channel matrix $E_k$ as defined by equation (8), the Signal to Noise Ratio (SNR) of the $l^{th}$ sub-data stream can be defined by equation (9) or (10) below. In equations (9) and (10), l indicates a transmission antenna index, wherein $l \in \{1, \ldots, 4\}$, and the $l^{th}$ sub-data stream refers to a data stream transmitted by the $l^{th}$ transmission antenna.

Equation (9) below defines an SNR of the $l^{th}$ sub-data stream when the DSTTD receiver 413 uses a ZF scheme-based V-BLAST scheme, and equation (10) below defines an SNR of the $l^{th}$ sub-data stream when the DSTTD receiver 413 uses an MMSE scheme-based V-BLAST scheme.

$$SNR_{ZF,l} = \frac{E_s}{N_0} \cdot \frac{1}{[(E_k^H E_k)^{-1}]_{l,l}} \quad (9)$$

In equation (9), $$\rho = \frac{E_s}{N_0},$$

$E_s$ indicates a transmission power of each transmission antenna, and H denotes a Hermitian operation.

$$SNR_{MMSE,l} = \frac{E_s}{N_0} \cdot \frac{1}{\left[\left(E_k^H E_k + \frac{1}{\rho}I_4\right)^{-1}\right]_{l,l}} - 1 \quad (10)$$

In equation (10), $$\rho = \frac{E_s}{N_0}.$$

In equations (9) and (10), a Gram matrix $G_k$ of the effective channel matrix $E_k$ is defined by equation (11) below.

$$G_k = \begin{bmatrix} G_{k,1,1} & G_{k,1,2} \\ G_{k,2,1} & G_{k,2,2} \end{bmatrix} = E_k^H E_k \qquad (11)$$

In equation (11), $G_{k,i,j}$ can be defined by equation (12) below.

$$G_{k,i,j} = \alpha_{k,i} I_2, \; i \in \{1,2\} \qquad (12)$$

In equation (12), $\alpha_{k,i}$ can be defined by equation (12) below.

$$\alpha_{k,i} = tr(W_{k,i}^T(h^*_1 h_1^T + h^*_3 h_3^T) W_{k,i+1}^T (h^*_2 h_2^T + h^*_4 h_4^T) W_{k,j+1}) \qquad (13)$$

In equation (13), tr (A) refers to a trace function for adding diagonal elements of a matrix A.

Further, $G_{k,i,j}$ can be defined by equation (14) below.

$$G_{k,i,j} = J^T F^*_{k,i,j} J + F_{k,i,j}, \; i \neq j \in \{1,2\} \qquad (14)$$

In equation (14), $F_{k,i,j}$ can be defined by equation (15) below.

$$F_{k,i,j} = W_{k,j}^T (h_1^* h_1^T + h_3^* h_3^T) W_{k,j} + \qquad (15)$$
$$W_{k,j}^T (h_1^* h_2^T + h_3^* h_4^T) W_{k,j+2} +$$
$$W_{k,j+2}^T (h_2^* h_2^T + h_4^* h_4^T) W_{k,j+2} +$$
$$W_{k,j+2}^T (h_2^* h_1^T + h_4^* h_3^T) W_{k,j}$$
$$\neq 0_2$$

As noted from equations (13) and (15), equations (13) and (15) can be changed according to the pre-processing matrix $W_k$. Therefore, it is also noted that the SNR as defined by equations (9) and (10) is also changeable.

Meanwhile, the signal reception apparatus can acquire the effective channel matrix $E_k$ as defined by equation (8) by using the pre-processing matrix $W_k$ and the MIMO channel H, and can detect the pre-processing matrix $W_k$ maximizing the SNR of the $l^{th}$ sub-data stream as defined by equations (9) and (10) by using equations (16) and (17) below. Here, the operation of detecting the pre-processing matrix $W_k$ maximizing the SNR is also called an optimization operation of the pre-processing matrix $W_k$.

$$\max_k \left( \min_l (SNR_{ZF,l}) \right), \; l \in \{1 = 2, 3 = 4\} \text{ and } \forall k \qquad (16)$$

$$\max_k \left( \min_l (SNR_{MMSE,l}) \right), \; l \in \{1 = 2, 3 = 4\} \text{ and } \forall k \qquad (17)$$

The signal reception apparatus transmits the pre-processing matrix information (i.e., the pre-processing matrix index k) of the pre-processing matrix $W_k$ detected in equations (16) and (17) to the signal transmission apparatus by using ceil ($\log_2 k$) bits. The ceil(x) function refers to a function indicating the smallest integer value larger than or equal to x. Then, the signal transmission apparatus uses the pre-processing matrix $W_k$ in accordance with the pre-processing matrix information (index) received from the signal reception apparatus.

Hereinafter, a process for designing a pre-processing matrix $W_k$ capable of maximizing the SNR in the signal reception apparatus and a pre-processing matrix set $\chi$ for reducing the number of bits included in the pre-processing matrix information will be described.

First, the following rules are set in designing a 4×4 pre-processing matrix $W_k$.

<Rule 1>

For data transmission, the 4×4 pre-processing matrix $W_k$ does not include a column of $[0\;0\;0\;0]^T$.

<Rule 2>

In order to perform STBC scheme-based wave detection, the 4×4 pre-processing matrix $W_k$ does not include a row of $[1\;1\;0\;0]^T$ or $[0\;0\;1\;1]^T$.

<Rule 3>

In order to maintain an average antenna transmission power, the 4×4 pre-processing matrix $W_k$ maintains four elements having a value of 1 from among all elements of the 4×4 pre-processing matrix $W_k$.

<Rule 4>

In order to perform STBC scheme-based wave detection, the 4×4 pre-processing matrix $W_k$ is designed to have an effective channel matrix $E_k$ that is a full rank matrix.

The rules described above allow design of 136 4×4 pre-processing matrixes $W_k$. Therefore, the signal reception apparatus should perform SNR calculation 136 times for each channel, and the pre-processing matrix information should include eight (ceil($\log_2$ 138)=8) bits.

As noted from the above description, as the number of the elements included in the pre-processing matrix set $\chi$ increases, that is, as the number of the pre-processing matrixes $W_k$ increases, the complexity of the signal reception apparatus caused by the optimization of the pre-processing matrix $W_k$ increases and the number of bits included in the pre-processing matrix information also increases.

Therefore, in order to reduce the number of the elements included in the pre-processing matrix set $\chi$, the following attributes are used.

<Attribute 1>

Even when locations of two STBC symbols are exchanged, the same SNR value is maintained.

<Attribute 2>

Even when all the elements included in two STBC symbols are changed, the same SNR value is maintained.

Hereinafter, <Attribute 1> and <Attribute 2> will be demonstrated.

First, <Attribute 1> is discussed.

When locations of two STBC symbols are exchanged, a new effective channel matrix $E_k'$ can be defined by $E_k P$. Here, P corresponds to a permutation matrix, which is $$\begin{bmatrix} 0_2 & I_2 \\ I_2 & 0_2 \end{bmatrix}.$$

It is noted that a relation as defined by equation (18) below is established in the case of using characteristics of the permutation matrix P. Now, characteristics of the permutation matrix P will be discussed. First, a permutation matrix P having a size of L has orthogonality ($P^H = P^{-1}$), and satisfies a condition of $[PMP]_{l,l} = [M]_{l',l'}$ for a matrix M having a size of L and for all l and l' ($l,l' \in \{1, \ldots, L\}$).

$$\left[ (E_k'^H E_k')^{-1} + \xi I_4 \right]_{l,l} = \left[ ((E_k P)^H E_k P)^{-1} + \xi I_4 \right]_{l,l} \qquad (18)$$
$$= \left[ P^H (E_k^H E_k)^{-1} P + \xi I_4 \right]_{l,l}$$
$$= \left[ (E_k^H E_k)^{-1} + \xi I_4 \right]_{l',l'}$$

In equation (18), $\xi$ indicates a real number that does not have a negative value, and $l'\neq l\in\{1,3\}$.

Therefore, results of optimization of the pre-processing matrix $W_k$ of equations (16) and (17) show no difference.

Second, <Attribute 2> is discussed.

When all the elements included in two STBC symbols are changed, a new effective channel matrix $E_k'$ can be defined by $BE_kC$. Here, a matrix B and a permutation matrix C indicate block diagonal matrixes in which matrixes b and c are diagonal elements, respectively. The matrixes b and c are defined by equation (19) below.

$$b = \begin{bmatrix} 1 & 0 \\ 0 & -1 \end{bmatrix}, c = \begin{bmatrix} 0 & 1 \\ 1 & 0 \end{bmatrix} \quad (19)$$

When using the characteristics of the permutation matrix C and the matrix B, it is noted that a relation as defined by equation (20) below is established.

$$\lfloor (E_k'^H E_k')^{-1} + \xi I_4 \rfloor_{l,l} = \lfloor ((BE_kC)^H BE_kC)^{-1} + \xi I_4 \rfloor_{l,l} \quad (20)$$

$$= [C(E_k^H E_k)^{-1} C + \xi I_4]_{l,l}$$

$$= [(E_k^H E_k)^{-1} + \xi I_4]$$

Further, because $E_k^H E_k$ is a Gram matrix, $l'=l$. Therefore, the results of optimization of the pre-processing matrix $W_k$ of equations (16) and (17) show no difference.

By using <Attribute 1> and <Attribute 2>, it is possible to reduce the 136 4×4 pre-processing matrixes $W_k$ to 36 4×4 pre-processing matrixes $W_k$. As used herein, a pre-processing matrix set including 36 4×4 pre-processing matrixes $W_k$ is called $\chi_{proposed}$. The pre-processing matrix set $\chi_{proposed}$ includes a pre-processing matrix set $x_0$, a pre-processing matrix set $x_1$, and a pre-processing matrix set $x_2$, as expressed by equation (21) below.

$$\chi_{proposed} = x_0 \cup x_1 \cup x_2 \quad (21)$$

The pre-processing matrix set $x_0$, the pre-processing matrix set $x_1$, and the pre-processing matrix set $x_2$ can be defined by equation (22), equation (23), and equation (24) below, respectively.

$$x_0 = \left\{ \begin{bmatrix} 1 & 0 & 0 & 0 \\ 0 & 1 & 0 & 0 \\ 0 & 0 & 1 & 0 \\ 0 & 0 & 0 & 1 \end{bmatrix}_{k=1}, \begin{bmatrix} 1 & 0 & 0 & 0 \\ 0 & 1 & 0 & 0 \\ 0 & 0 & 0 & 1 \\ 0 & 0 & 1 & 0 \end{bmatrix}_{k=2}, \begin{bmatrix} 1 & 0 & 0 & 0 \\ 0 & 0 & 1 & 0 \\ 0 & 1 & 0 & 0 \\ 0 & 0 & 0 & 1 \end{bmatrix}_{k=3}, \begin{bmatrix} 1 & 0 & 0 & 0 \\ 0 & 0 & 0 & 1 \\ 0 & 1 & 0 & 0 \\ 0 & 0 & 1 & 0 \end{bmatrix}_{k=4}, \right.$$

$$\left. \begin{bmatrix} 1 & 0 & 0 & 0 \\ 0 & 0 & 1 & 0 \\ 0 & 0 & 0 & 1 \\ 0 & 1 & 0 & 0 \end{bmatrix}_{k=5}, \begin{bmatrix} 1 & 0 & 0 & 0 \\ 0 & 0 & 0 & 1 \\ 0 & 0 & 1 & 0 \\ 0 & 1 & 0 & 0 \end{bmatrix}_{k=6} \right\} \quad (22)$$

$$x_1 = \left\{ \begin{bmatrix} 1 & 0 & 0 & 1 \\ 0 & 1 & 0 & 0 \\ 0 & 0 & 1 & 0 \\ 0 & 0 & 0 & 0 \end{bmatrix}_{k=7}, \begin{bmatrix} 1 & 0 & 1 & 0 \\ 0 & 0 & 0 & 1 \\ 0 & 1 & 0 & 0 \\ 0 & 0 & 0 & 0 \end{bmatrix}_{k=8}, \begin{bmatrix} 0 & 1 & 0 & 0 \\ 0 & 0 & 0 & 1 \\ 1 & 0 & 1 & 0 \\ 0 & 0 & 0 & 0 \end{bmatrix}_{k=9}, \begin{bmatrix} 0 & 1 & 0 & 0 \\ 1 & 0 & 0 & 1 \\ 0 & 0 & 1 & 0 \\ 0 & 0 & 0 & 0 \end{bmatrix}_{k=10}, \right.$$

$$\begin{bmatrix} 0 & 1 & 0 & 0 \\ 1 & 0 & 1 & 0 \\ 0 & 0 & 0 & 1 \\ 0 & 0 & 0 & 0 \end{bmatrix}_{k=11}, \begin{bmatrix} 0 & 1 & 0 & 0 \\ 0 & 0 & 1 & 0 \\ 1 & 0 & 0 & 1 \\ 0 & 0 & 0 & 0 \end{bmatrix}_{k=12}, \begin{bmatrix} 1 & 0 & 0 & 1 \\ 0 & 1 & 0 & 0 \\ 0 & 0 & 0 & 0 \\ 0 & 0 & 1 & 0 \end{bmatrix}_{k=13}, \begin{bmatrix} 1 & 0 & 1 & 0 \\ 0 & 0 & 0 & 1 \\ 0 & 0 & 0 & 0 \\ 0 & 1 & 0 & 0 \end{bmatrix}_{k=14},$$

$$\begin{bmatrix} 0 & 1 & 0 & 0 \\ 0 & 0 & 0 & 1 \\ 0 & 0 & 0 & 0 \\ 1 & 0 & 1 & 0 \end{bmatrix}_{k=15}, \begin{bmatrix} 0 & 1 & 0 & 0 \\ 1 & 0 & 1 & 0 \\ 0 & 0 & 0 & 0 \\ 0 & 0 & 0 & 1 \end{bmatrix}_{k=16}, \begin{bmatrix} 0 & 1 & 0 & 0 \\ 0 & 0 & 1 & 0 \\ 0 & 0 & 0 & 0 \\ 1 & 0 & 0 & 1 \end{bmatrix}_{k=17}, \begin{bmatrix} 0 & 1 & 0 & 0 \\ 1 & 0 & 0 & 1 \\ 0 & 0 & 0 & 0 \\ 0 & 0 & 1 & 0 \end{bmatrix}_{k=18},$$

$$\begin{bmatrix} 1 & 0 & 0 & 1 \\ 0 & 0 & 0 & 0 \\ 0 & 0 & 1 & 0 \\ 0 & 1 & 0 & 0 \end{bmatrix}_{k=19}, \begin{bmatrix} 1 & 0 & 1 & 0 \\ 0 & 0 & 0 & 0 \\ 0 & 1 & 0 & 0 \\ 0 & 0 & 0 & 1 \end{bmatrix}_{k=20}, \begin{bmatrix} 0 & 1 & 0 & 0 \\ 0 & 0 & 0 & 0 \\ 0 & 0 & 0 & 1 \\ 1 & 0 & 1 & 0 \end{bmatrix}_{k=21},$$

$$\begin{bmatrix} 0 & 1 & 0 & 0 \\ 0 & 0 & 0 & 0 \\ 1 & 0 & 1 & 0 \\ 0 & 0 & 0 & 1 \end{bmatrix}_{k=22}, \begin{bmatrix} 0 & 1 & 0 & 0 \\ 0 & 0 & 0 & 0 \\ 0 & 0 & 1 & 0 \\ 1 & 0 & 0 & 1 \end{bmatrix}_{k=23}, \begin{bmatrix} 0 & 1 & 0 & 0 \\ 0 & 0 & 0 & 0 \\ 1 & 0 & 0 & 1 \\ 0 & 0 & 1 & 0 \end{bmatrix}_{k=24},$$

$$\begin{bmatrix} 0 & 0 & 0 & 0 \\ 1 & 0 & 0 & 1 \\ 0 & 0 & 1 & 0 \\ 0 & 1 & 0 & 0 \end{bmatrix}_{k=25}, \begin{bmatrix} 0 & 0 & 0 & 0 \\ 1 & 0 & 1 & 0 \\ 0 & 0 & 0 & 1 \\ 0 & 1 & 0 & 0 \end{bmatrix}_{k=26}, \begin{bmatrix} 0 & 0 & 0 & 0 \\ 0 & 0 & 0 & 1 \\ 1 & 0 & 1 & 0 \\ 0 & 1 & 0 & 0 \end{bmatrix}_{k=27},$$

$$\left. \begin{bmatrix} 0 & 0 & 0 & 0 \\ 0 & 0 & 0 & 1 \\ 0 & 1 & 0 & 0 \\ 1 & 0 & 0 & 1 \end{bmatrix}_{k=28}, \begin{bmatrix} 0 & 0 & 0 & 0 \\ 0 & 1 & 0 & 0 \\ 0 & 0 & 1 & 0 \\ 1 & 0 & 0 & 1 \end{bmatrix}_{k=29}, \begin{bmatrix} 0 & 0 & 0 & 0 \\ 0 & 1 & 0 & 0 \\ 1 & 0 & 0 & 1 \\ 0 & 0 & 1 & 0 \end{bmatrix}_{k=30} \right\} \quad (23)$$

$$x_2 = \left\{ \begin{bmatrix} 1 & 0 & 0 & 1 \\ 0 & 1 & 1 & 0 \\ 0 & 0 & 0 & 0 \\ 0 & 0 & 0 & 0 \end{bmatrix}_{k=31}, \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32}, \begin{bmatrix} 0 & 0 & 0 & 0 \\ 1 & 0 & 0 & 1 \\ 0 & 1 & 1 & 0 \\ 0 & 0 & 0 & 0 \end{bmatrix}_{k=33}, \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34}, \right.$$

$$\left. \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35}, \begin{bmatrix} 0 & 0 & 0 & 0 \\ 0 & 0 & 0 & 0 \\ 1 & 0 & 0 & 1 \\ 0 & 1 & 1 & 0 \end{bmatrix}_{k=36} \right\} \quad (24)$$

Each row of the pre-processing matrix $W_k$ as defined by equations (22) to (24) is mapped to a transmission antenna index, and each column thereof is mapped to an input index of the pre-processing unit 315.

As noted from equations (22) to (24), pre-processing matrix sets included in the pre-processing matrix set $\chi_{proposed}$, that is, the pre-processing matrix set $x_0$, the pre-processing matrix set $x_1$, and the pre-processing matrix set $x_2$, have the following characteristics, which will be described briefly below.

First, the pre-processing matrix set $x_0$ is substantially the same as the antenna grouping matrix set as defined by equation (1), and pre-processing matrixes included in the pre-processing matrix set $x_0$ transmit the data stream through each transmission antenna.

Second, pre-processing matrixes included in the pre-processing matrix set $x_1$ transmit the data stream through only three transmission antennas from among the four transmission antennas.

Third, pre-processing matrixes included in the pre-processing matrix set $x_2$ transmit the data stream through only two transmission antennas from among the four transmission antennas.

Hereinafter, results of performance simulation of a MIMO mobile communication system in the case of using the pre-processing matrix set $\chi_{proposed}$, the pre-processing matrix set $x_0$, the pre-processing matrix set $x_1$, and the pre-processing matrix set $x_2$ will be described with reference to FIG. 5.

Figure 5:
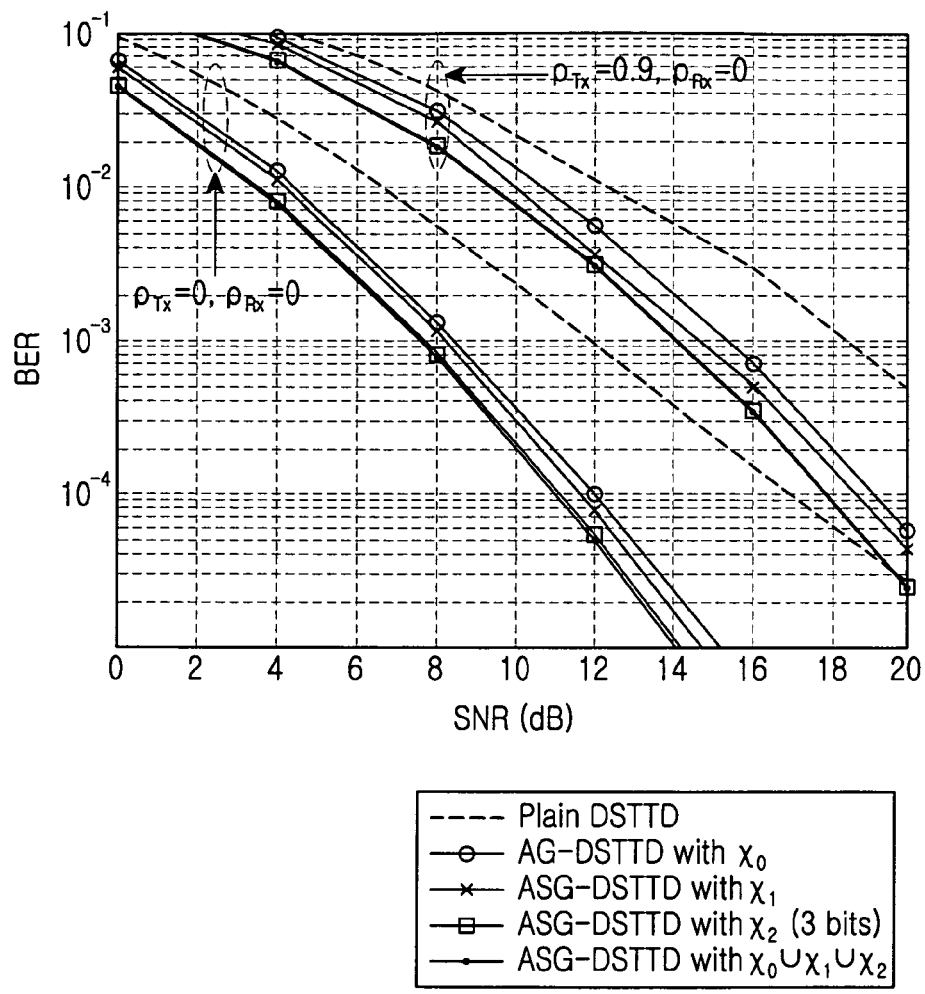
FIG. 5 is a graph illustrating results of performance simulation of a MIMO mobile communication system in which a DSTTD receiver 413 of FIG. 4 uses a V-BLAST scheme based on a ZF scheme and a pre-processing matrix information is expressed by 3 bits.

FIG. 5 is a graph illustrating results of performance simulation of a MIMO mobile communication system in which a DSTTD receiver 413 of FIG. 4 uses a V-BLAST scheme based on a ZF scheme and a pre-processing matrix information is expressed by 3 bits.

Referring to FIG. 5, the curve named "Plain DSTTD" corresponds to a Bit Error Rate (BER) performance curve in the case of using a typical DSTTD scheme, the curve named "AG-DSTTD" corresponds to a BER performance curve in the case of using antenna grouping matrix information, the curve named "ASG-DSTTD with $x_1$" corresponds to a BER performance curve in the case of using the pre-processing matrix set $x_1$, the curve named "ASG-DSTTD with $x_2$ (3bits)" corresponds to a BER performance curve in the case of using the pre-processing matrix set $x_2$ using 3 bits of pre-processing matrix information, and the curve named "ASG-DSTTD with $x_0 \cup x_1 \cup x_2$" corresponds to a BER performance curve in the case of using the pre-processing matrix set $\chi_{proposed}$.

Further, it should be noted that the BER performance graph illustrated in FIG. 5 has been obtained from the simulations under the following environments.

First, a Quadrature Phase Shift Keying (QPSK) scheme is used without encoding bit information.

Second, a V-BLAST scheme based on the ZF scheme is used.

Third, a quasi-static Rayleigh fading channel in which there is no change in the same packet is taken into consideration, and it is assumed that the pre-processing matrix information for each packet is completely received.

Fourth, in consideration of the correlation value of the transmission and reception antennas, $R_T$ and $R_R$ use a transmission power correlation factor $\rho_{TX}$ ($\rho_{TX}$=0.9) and a reception power correlation factor $\rho_{Rx}$ ($\rho_{Rx}$=0).

From FIG. 5, which shows performances of MIMO mobile communication systems using the pre-processing matrix set $\chi_{proposed}$, the pre-processing matrix set $x_0$, the pre-processing matrix set $x_1$, and the pre-processing matrix set $x_2$, respectively, it is noted that the MIMO mobile communication system using the pre-processing matrix set $\chi_{proposed}$ has the same BER as that of the MIMO mobile communication system using the pre-processing matrix set $x_2$. It is also noted that the MIMO mobile communication system using the pre-processing matrix set $\chi_{proposed}$ has an improved BER performance as compared to that of the MIMO mobile communication system using the conventional antenna grouping matrix, that is, the pre-processing matrix set $x_0$. Therefore, it can be concluded that the MIMO mobile communication system using the pre-processing matrix set $x_2$ has an improved BER performance while using 3 bits of pre-processing matrix information. In other words, the MIMO mobile communication system using the pre-processing matrix set $x_2$ has an improved BER performance while using the same bits (3 bits) of pre-processing matrix information of the conventional antenna grouping matrix information.

Meanwhile, reduction of the number of bits included in the pre-processing matrix information may reduce the overhead of the entire MIMO mobile communication system. Therefore, it is preferable to keep the number of bits included in the pre-processing matrix information as small as possible. Therefore, the present invention also proposes an apparatus and a method for performing pre-processing by using 2 bits of pre-processing matrix information, which will be described in detail hereinafter.

First, since the pre-processing matrix set $x_2$ includes a total of six pre-processing matrixes, the pre-processing matrix information should include three bits in order to express the pre-processing matrixes included in the pre-processing matrix set $x_2$. However, in order to make the pre-processing matrix information include only two bits, the present invention proposes generation of a new pre-processing matrix set by selecting four pre-processing matrixes from the six pre-processing matrixes included in the pre-processing matrix set $x_2$. As used herein, the new pre-processing matrix set generated in the way described above is referred to as $x_{2,2bits}$. The new pre-processing matrix set $x_{2,2bits}$ can be defined by one of equations (25) to (27) below.

$$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32} \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34} \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35} \begin{bmatrix} 1 & 0 & 0 & 1 \\ 0 & 1 & 1 & 0 \\ 0 & 0 & 0 & 0 \\ 0 & 0 & 0 & 0 \end{bmatrix}_{k=31} \right\} \quad (25)$$

$$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32} \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34} \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35} \begin{bmatrix} 0 & 0 & 0 & 0 \\ 1 & 0 & 0 & 1 \\ 0 & 1 & 1 & 0 \\ 0 & 0 & 0 & 0 \end{bmatrix}_{k=33} \right\} \quad (26)$$

$$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32} \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34} \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35} \begin{bmatrix} 0 & 0 & 0 & 0 \\ 0 & 0 & 0 & 0 \\ 1 & 0 & 0 & 1 \\ 0 & 1 & 1 & 0 \end{bmatrix}_{k=36} \right\} \quad (27)$$

Hereinafter, an operation of pre-processing by the pre-processing unit 315 based on the pre-processing matrixes included in the pre-processing matrix set $x_2$ will be described.

First, a DSTTD symbol $S_i$ generated in accordance with a rearranged transmission data stream $\tilde{X}_i$ as defined by equation (2) can be defined by equation (28) below.

$$S_i = \begin{bmatrix} x_l & -x_m^* \\ x_m & x_l^* \\ x_n & -x_o^* \\ x_o & x_n^* \end{bmatrix} \quad (28)$$

In equation (28), each row of the DSTTD symbol $S_i$ is mapped to an input index of the pre-processing unit 315, and each column thereof is mapped to a symbol index of the pre-processing unit 315.

Then, the final transmission symbol $W_k S_i$ generated by the pre-processing unit 315 in accordance with each of the pre-processing matrixes included in the pre-processing matrix set $x_2$ can be defined by equation (29) below.

$$W_k S_i = \left\{ \left[ \begin{array}{cc} x_l + x_o & -x_m^* + x_n^* \\ x_m + x_n & x_l^* - x_o^* \\ 0 & 0 \\ 0 & 0 \end{array} \right]_{k=31}, \left[ \begin{array}{cc} x_l + x_o & -x_m^* + x_n^* \\ 0 & 0 \\ x_m + x_n & x_l^* - x_o^* \\ 0 & 0 \end{array} \right]_{k=32}, \right. \tag{29}$$

$$\left[ \begin{array}{cc} 0 & 0 \\ x_l + x_o & -x_m^* + x_n^* \\ x_m + x_n & x_l^* - x_o^* \\ 0 & 0 \end{array} \right]_{k=33}, \left[ \begin{array}{cc} x_l + x_o & -x_m^* + x_n^* \\ 0 & 0 \\ 0 & 0 \\ x_m + x_n & x_l^* - x_o^* \end{array} \right]_{k=34},$$

$$\left. \left[ \begin{array}{cc} 0 & 0 \\ x_l + x_o & -x_m^* + x_n^* \\ 0 & 0 \\ x_m + x_n & x_l^* - x_o^* \end{array} \right]_{k=35}, \left[ \begin{array}{cc} 0 & 0 \\ 0 & 0 \\ x_l + x_o & -x_m^* + x_n^* \\ x_m + x_n & x_l^* - x_o^* \end{array} \right]_{k=36} \right\}$$

In equation (29), each row of the final transmission symbol $W_k S_i$ is mapped to a transmission antenna input index, and each column thereof is mapped to a symbol index. That is, the final transmission symbol $W_k S_i$ is transmitted during two symbol periods. Of course, in the case of using the OFDM scheme as described above, it is possible to transmit the final transmission symbol $W_k S_i$ through two adjacent two sub-carriers during one symbol period.

Further, for example, if the DSTTD symbol $S_i$ is defined as in equation (3), the final transmission symbol $W_k S_i$ generated by the pre-processing unit 315 in accordance with each of the pre-processing matrixes included in the pre-processing matrix set can be defined by equation (30) below.

$$W_k S_1 = \left\{ \left[ \begin{array}{cc} x_1 + x_4 & -x_2^* + x_3^* \\ x_2 + x_3 & x_1^* - x_4^* \\ 0 & 0 \\ 0 & 0 \end{array} \right]_{k=31}, \left[ \begin{array}{cc} x_1 + x_4 & -x_2^* + x_3^* \\ 0 & 0 \\ x_2 + x_3 & x_1^* - x_4^* \\ 0 & 0 \end{array} \right]_{k=32}, \right. \tag{30}$$

$$\left[ \begin{array}{cc} 0 & 0 \\ x_1 + x_4 & -x_2^* + x_3^* \\ x_2 + x_3 & x_1^* - x_4^* \\ 0 & 0 \end{array} \right]_{k=33}, \left[ \begin{array}{cc} x_1 + x_4 & -x_2^* + x_3^* \\ 0 & 0 \\ 0 & 0 \\ x_2 + x_3 & x_1^* - x_4^* \end{array} \right]_{k=34},$$

$$\left. \left[ \begin{array}{cc} 0 & 0 \\ x_1 + x_4 & -x_2^* + x_3^* \\ 0 & 0 \\ x_2 + x_3 & x_1^* - x_4^* \end{array} \right]_{k=35}, \left[ \begin{array}{cc} 0 & 0 \\ 0 & 0 \\ x_1 + x_4 & -x_2^* + x_3^* \\ x_2 + x_3 & x_1^* - x_4^* \end{array} \right]_{k=36} \right\}$$

$$W_k S_2 = \left\{ \left[ \begin{array}{cc} x_1 + x_4 & -x_3^* + x_2^* \\ x_3 + x_2 & x_1^* - x_4^* \\ 0 & 0 \\ 0 & 0 \end{array} \right]_{k=31}, \left[ \begin{array}{cc} x_1 + x_4 & -x_3^* + x_2^* \\ 0 & 0 \\ x_3 + x_2 & x_1^* - x_4^* \\ 0 & 0 \end{array} \right]_{k=32}, \right.$$

$$\left[ \begin{array}{cc} 0 & 0 \\ x_1 + x_4 & -x_3^* + x_2^* \\ x_3 + x_2 & x_1^* - x_4^* \\ 0 & 0 \end{array} \right]_{k=33}, \left[ \begin{array}{cc} x_1 + x_4 & -x_3^* + x_2^* \\ 0 & 0 \\ 0 & 0 \\ x_3 + x_2 & x_1^* - x_4^* \end{array} \right]_{k=34},$$

$$\left. \left[ \begin{array}{cc} 0 & 0 \\ x_1 + x_4 & -x_3^* + x_2^* \\ 0 & 0 \\ x_3 + x_2 & x_1^* - x_4^* \end{array} \right]_{k=35}, \left[ \begin{array}{cc} 0 & 0 \\ 0 & 0 \\ x_1 + x_4 & -x_3^* + x_2^* \\ x_3 + x_2 & x_1^* - x_4^* \end{array} \right]_{k=36} \right\}$$

⋮

$$W_k S_{24} = \left\{ \left[ \begin{array}{cc} x_4 + x_1 & -x_3^* + x_2^* \\ x_3 + x_2 & x_4^* - x_1^* \\ 0 & 0 \\ 0 & 0 \end{array} \right]_{k=31}, \left[ \begin{array}{cc} x_4 + x_1 & -x_3^* + x_2^* \\ 0 & 0 \\ x_3 + x_2 & x_4^* - x_1^* \\ 0 & 0 \end{array} \right]_{k=32}, \right.$$

$$\left[ \begin{array}{cc} 0 & 0 \\ x_4 + x_1 & -x_3^* + x_2^* \\ x_3 + x_2 & x_4^* - x_1^* \\ 0 & 0 \end{array} \right]_{k=33}, \left[ \begin{array}{cc} x_4 + x_1 & -x_3^* + x_2^* \\ 0 & 0 \\ 0 & 0 \\ x_3 + x_2 & x_4^* - x_1^* \end{array} \right]_{k=34},$$

$$\left. \left[ \begin{array}{cc} 0 & 0 \\ x_4 + x_1 & -x_3^* + x_2^* \\ 0 & 0 \\ x_3 + x_2 & x_4^* + x_1^* \end{array} \right]_{k=35}, \left[ \begin{array}{cc} 0 & 0 \\ 0 & 0 \\ x_4 + x_1 & -x_3^* + x_2^* \\ x_3 + x_2 & x_4^* - x_1^* \end{array} \right]_{k=36} \right\}$$

Therefore, the final transmission symbol $W_k S_i$ corresponding to the pre-processing matrix set $x_{2,2bits}$ as defined by equations (25) to (27) can be defined by equations (31) to (33).

$$W_k S_i = \left\{ \left[ \begin{array}{cc} x_l + x_o & -x_m^* + x_n^* \\ 0 & 0 \\ x_m + x_n & x_l^* - x_o^* \\ 0 & 0 \end{array} \right]_{k=32}, \left[ \begin{array}{cc} x_l + x_o & -x_m^* + x_n^* \\ 0 & 0 \\ 0 & 0 \\ x_m + x_n & x_l^* - x_o^* \end{array} \right]_{k=34}, \right. \tag{31}$$

$$\left. \left[ \begin{array}{cc} 0 & 0 \\ x_l + x_o & -x_m^* + x_n^* \\ 0 & 0 \\ x_m + x_n & x_l^* - x_o^* \end{array} \right]_{k=35}, \left[ \begin{array}{cc} x_l + x_o & -x_m^* + x_n^* \\ x_m + x_n & x_l^* - x_o^* \\ 0 & 0 \\ 0 & 0 \end{array} \right]_{k=31} \right\}$$

$$W_k S_i = \left\{ \left[ \begin{array}{cc} x_l + x_o & -x_m^* + x_n^* \\ 0 & 0 \\ x_m + x_n & x_l^* - x_o^* \\ 0 & 0 \end{array} \right]_{k=32}, \left[ \begin{array}{cc} x_l + x_o & -x_m^* + x_n^* \\ 0 & 0 \\ 0 & 0 \\ x_m + x_n & x_l^* - x_o^* \end{array} \right]_{k=34}, \right. \tag{32}$$

$$\left. \left[ \begin{array}{cc} 0 & 0 \\ x_l + x_o & -x_m^* + x_n^* \\ 0 & 0 \\ x_m + x_n & x_l^* - x_o^* \end{array} \right]_{k=35}, \left[ \begin{array}{cc} 0 & 0 \\ x_l + x_o & -x_m^* + x_n^* \\ x_m + x_n & x_l^* - x_o^* \\ 0 & 0 \end{array} \right]_{k=33} \right\}$$

-continued $$W_k S_i = \left\{ \begin{bmatrix} x_l + x_o & -x_m^* + x_n^* \\ 0 & 0 \\ x_m + x_n & x_l^* - x_o^* \\ 0 & 0 \end{bmatrix}_{k=32}, \begin{bmatrix} x_l + x_o & -x_m^* + x_n^* \\ 0 & 0 \\ 0 & 0 \\ x_m + x_n & x_l^* - x_o^* \end{bmatrix}_{k=34}, \right.$$
$$\left. \begin{bmatrix} 0 & 0 \\ x_l + x_o & -x_m^* + x_n^* \\ 0 & 0 \\ x_m + x_n & x_l^* - x_o^* \end{bmatrix}_{k=35}, \begin{bmatrix} 0 & 0 \\ 0 & 0 \\ x_l + x_o & -x_m^* + x_n^* \\ x_m + x_n & x_l^* - x_o^* \end{bmatrix}_{k=36} \right\}$$
(33)

In the meantime, the BER performance in the case of using the pre-processing matrix information including two bits is similar to the BER performance in the case of using the pre-processing matrix information including typical three bits, which will be described hereinafter with reference to FIG. 6.

Figure 6:
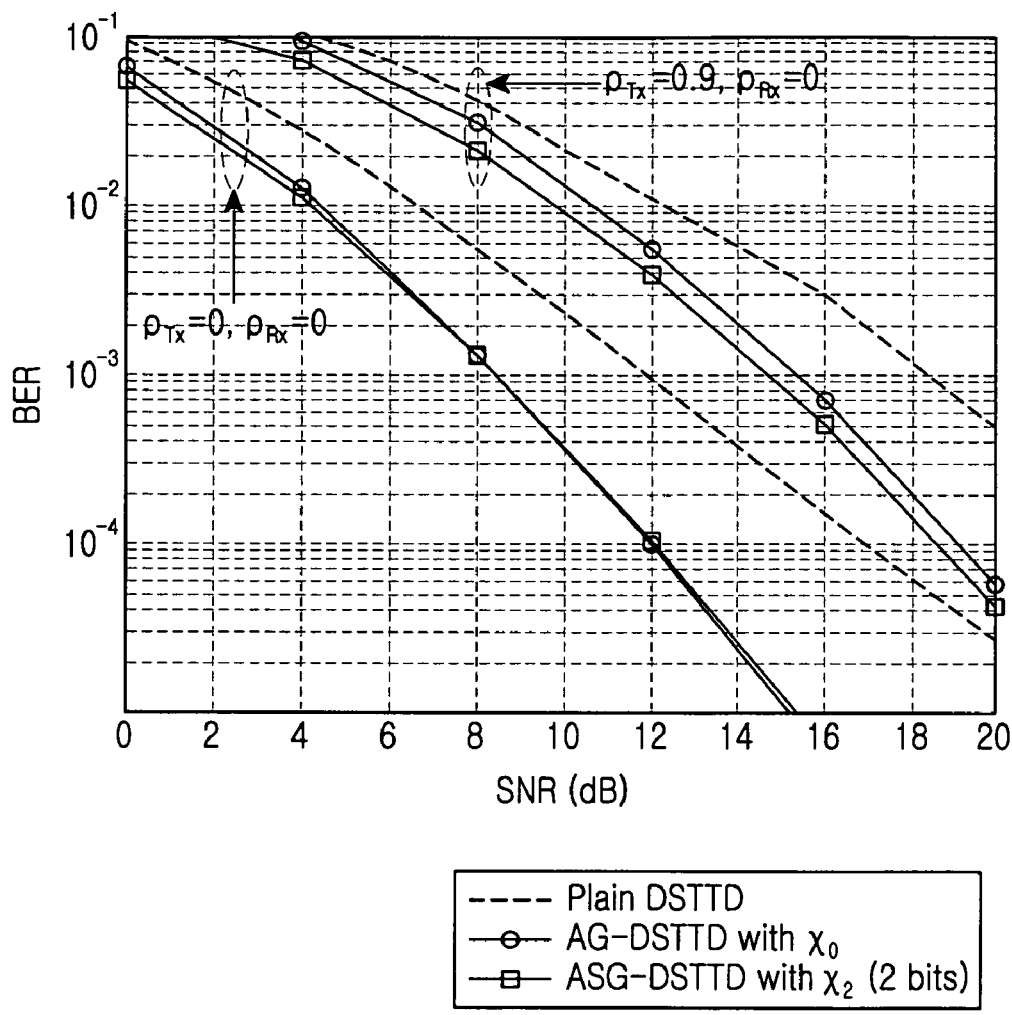
FIG. 6 is a graph illustrating results of performance simulation of a MIMO mobile communication system in which a DSTTD receiver 413 of FIG. 4 uses a V-BLAST scheme based on a ZF scheme and a pre-processing matrix information is expressed by 2 bits.

FIG. 6 is a graph illustrating results of performance simulation of a MIMO mobile communication system in which a DSTTD receiver 413 of FIG. 4 uses a V-BLAST scheme based on a ZF scheme and a pre-processing matrix information is expressed by 2 bits.

Referring to FIG. 6, the curve named "Plain DSTTD" corresponds to a BER performance curve in the case of using a typical DSTTD scheme, the curve named "AG-DSTTD" corresponds to a BER performance curve in the case of using antenna grouping matrix information, and the curve named "ASG-DSTTD with $x_2$ (2 bits)" corresponds to a BER performance curve in the case of using the pre-processing matrix set $x_2$ using 2 bits of pre-processing matrix information. Further, it should be noted that the BER performance graph illustrated in FIG. 6 has been obtained in the same simulation environments as those assumed in FIG. 5.

As noted from FIG. 6, an antenna grouping matrix set using three bits of antenna grouping matrix information, that is, the pre-processing matrix set $x_0$, has nearly the same BER as that of the pre-processing matrix set $x_{2,2bits}$ using two bits of pre-processing matrix information. Therefore, it is noted that the MIMO mobile communication system using the pre-processing matrix set $x_{2,2bits}$ has nearly the same BER performance while using two bits of pre-processing matrix information smaller than the three bits of the pre-processing matrix information included in the conventional antenna grouping matrix information.

Meanwhile, the signal transmission apparatus and the signal reception apparatus described above with reference to FIGS. 3 and 4 correspond to a signal transmission apparatus and a signal reception apparatus using four transmission antennas and a rate having a value of 2 in a MIMO mobile communication system.

Next, structures of a signal transmission apparatus and a signal reception apparatus using four transmission antennas and a rate having a value of 1 in a MIMO mobile communication system will be described with reference to FIGS. 7 and 8, structures of a signal transmission apparatus and a signal reception apparatus using three transmission antennas and a rate having a value of 2 in a MIMO mobile communication system will be described with reference to FIGS. 9 and 10, and structures of a signal transmission apparatus and a signal reception apparatus using three transmission antennas and a rate having a value of 1 in a MIMO mobile communication system will be described with reference to FIGS. 11 and 12.

First, by using the channel matrix H and the pre-processing matrix $W_k$, the signal reception apparatus can acquire an effective channel and can detect the index k of the pre-processing matrix $W_k$ satisfying the definition of equations (34) to (37) below.

$$\min_k \left( \max_l (BER_l) \right), l \in \{1, \ldots, \text{stream number}\} \quad (34)$$

The index k satisfying the definition of equation (34) corresponds to an index that minimizes the maximum BER.

$$\max_k \left( \sum_l Capacity_l \right), l \in \{1, \ldots, \text{stream number}\} \quad (35)$$

The index k satisfying the definition of equation (35) corresponds to an index that maximizes the capacity.

$$\max_k \left( \prod_l SNR_l \right), l \in \{1, \ldots, \text{stream number}\} \text{ or} \quad (36)$$
$$\max_k \left( \sum_l SNR_l \right), l \in \{1, \ldots, \text{stream number}\}$$

The index k satisfying the definition of equation (36) corresponds to an index that maximizes the SNR.

$$\max_k \left( \prod_l SINR_l \right), l \in \{1, \ldots, \text{stream number}\} \text{ or} \quad (37)$$
$$\max_k \left( \sum_l SINR_l \right), l \in \{1, \ldots, \text{stream number}\}$$

The index k satisfying the definition of equation (37) corresponds to an index that maximizes the SINR.

Hereinafter, a structure of a signal transmission apparatus using four transmission antennas and a rate having a value of 1 in a MIMO mobile communication system according to an embodiment of the present invention will be described with reference to FIG. 7.

Figure 7:
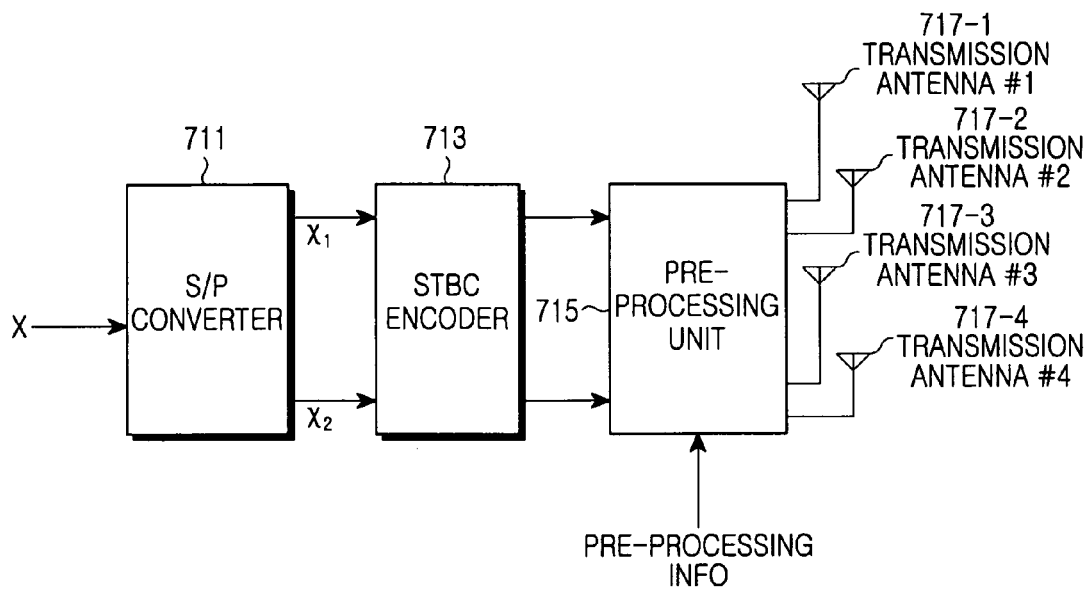
FIG. 7 is a block diagram illustrating a signal transmission apparatus using four transmission antennas and a rate having a value of 1 in a MIMO mobile communication system according to an embodiment of the present invention.

FIG. 7 is a block diagram illustrating a signal transmission apparatus using four transmission antennas and a rate having a value of 1 in a MIMO mobile communication system according to an embodiment of the present invention.

Referring to FIG. 7, the signal transmission apparatus includes a Serial-to-Parallel (S/P) converter 711, an STBC encoder 713, a pre-processing unit 715, and transmission antennas 717-1, 717-2, 717-3, and 717-4.

First, when a transmission data stream X to be transmitted occurs, the transmission data stream X is input to the S/P converter 711. The transmission data stream X is defined by $X = [X_1 X_2]^T$, and includes two (i.e., 2!) permutations.

Then, the S/P converter 711 rearranges the transmission data stream X by using a predetermined permutation as shown in equation (38) below, thereby generating a rearranged transmission data stream $\tilde{X}_i$, wherein i denotes a permutation index. That is, the permutation index i indicates an index of a corresponding permutation from among the two permutations included in the transmission data stream X.

$$\tilde{X}_i = [x_l x_m]^T \quad (38)$$

In equation (38), $l \neq m$, and $l, m \in \{1, 2\}$.

The S/P converter 711 converts the rearranged transmission data stream $\tilde{X}_i$ into two parallel sub-transmission data streams, and then outputs the two generated sub-transmission data streams to the STBC encoder 713. The STBC encoder 713 encodes the input sub-transmission data streams according to the STBC scheme and then outputs the encoded sub-transmission data streams to the pre-processing unit 715. Then, the pre-processing unit 715 converts the signals output from the STBC encoder 713 into a serial signal, thereby generating an STBC symbol $S_i$ as defined by equation (39) below.

$$S_1 = \begin{bmatrix} x_1 & -x_2^* \\ x_2 & x_1^* \end{bmatrix},$$

$$S_2 = \begin{bmatrix} x_2 & -x_1^* \\ x_1 & x_2^* \end{bmatrix}$$

(39)

As noted from equation (39), it is possible to generate two types of DSTTD symbols $S_i$, because it is possible to generate two types of rearranged transmission data streams $\tilde{X}_i$.

Here, the final transmission symbol, which is transmitted through a corresponding transmission antenna by the pre-processing unit 715, can be defined by equation (40) below.

$$A_k S_1 = \left\{ \begin{bmatrix} x_1 & -x_2^* \\ x_2 & x_1^* \\ 0 & 0 \\ 0 & 0 \end{bmatrix}_{k=1}, \begin{bmatrix} x_1 & -x_2^* \\ 0 & 0 \\ x_2 & x_1^* \\ 0 & 0 \end{bmatrix}_{k=2}, \begin{bmatrix} x_1 & -x_2^* \\ 0 & 0 \\ 0 & 0 \\ x_2 & x_1^* \end{bmatrix}_{k=3}, \begin{bmatrix} 0 & 0 \\ x_1 & -x_2^* \\ x_2 & x_1^* \\ 0 & 0 \end{bmatrix}_{k=4}, \begin{bmatrix} 0 & 0 \\ x_1 & -x_2^* \\ 0 & 0 \\ x_2 & x_1^* \end{bmatrix}_{k=5}, \begin{bmatrix} 0 & 0 \\ 0 & 0 \\ x_1 & -x_2^* \\ x_2 & x_1 \end{bmatrix}_{k=6} \right\}$$

(40)

Or $$A_k S_2 = \left\{ \begin{bmatrix} x_2 & -x_1^* \\ x_1 & x_2^* \\ 0 & 0 \\ 0 & 0 \end{bmatrix}_{k=1}, \begin{bmatrix} x_2 & -x_1^* \\ 0 & 0 \\ x_1 & x_2^* \\ 0 & 0 \end{bmatrix}_{k=2}, \begin{bmatrix} x_2 & -x_1^* \\ 0 & 0 \\ 0 & 0 \\ x_1 & x_2^* \end{bmatrix}_{k=3}, \begin{bmatrix} 0 & 0 \\ x_2 & -x_1^* \\ x_1 & x_2^* \\ 0 & 0 \end{bmatrix}_{k=4}, \begin{bmatrix} 0 & 0 \\ x_2 & -x_1^* \\ 0 & 0 \\ x_1 & x_2^* \end{bmatrix}_{k=5}, \begin{bmatrix} 0 & 0 \\ 0 & 0 \\ x_2 & -x_1^* \\ x_1 & x_2^* \end{bmatrix}_{k=6} \right\}$$

In equation (40), $A_k$ corresponds to a pre-processing matrix $W_k$ in the case of using four transmission antennas and a rate having a value of 1 in a MIMO mobile communication system. Here, $A_k$ can be defined by equation (41) below, pre-processing matrix information indicating $A_k$ includes three bits.

$$A_k \in \left\{ \begin{bmatrix} 1 & 0 \\ 0 & 1 \\ 0 & 0 \\ 0 & 0 \end{bmatrix}_{k=1}, \begin{bmatrix} 1 & 0 \\ 0 & 0 \\ 0 & 1 \\ 0 & 0 \end{bmatrix}_{k=2}, \begin{bmatrix} 1 & 0 \\ 0 & 0 \\ 0 & 0 \\ 0 & 1 \end{bmatrix}_{k=3}, \begin{bmatrix} 0 & 0 \\ 1 & 0 \\ 0 & 1 \\ 0 & 0 \end{bmatrix}_{k=4}, \begin{bmatrix} 0 & 0 \\ 1 & 0 \\ 0 & 0 \\ 0 & 1 \end{bmatrix}_{k=5}, \begin{bmatrix} 0 & 0 \\ 0 & 0 \\ 1 & 0 \\ 0 & 1 \end{bmatrix}_{k=6} \right\}$$

(41)

Each row of the pre-processing matrix $A_k$ defined by equation (41) is mapped to a transmission antenna index, and each column thereof is mapped to an input index of a pre-processing unit performing the pre-processing.

Next, a structure of a signal reception apparatus using four transmission antennas and a rate having a value of 1 in a MIMO mobile communication system according to an embodiment of the present invention will be described with reference to FIG. 8.

Figure 8:
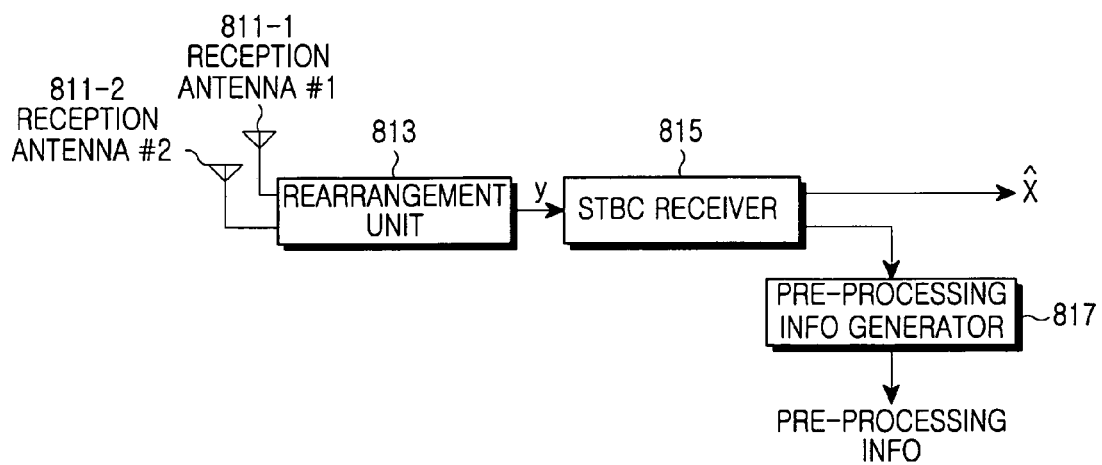
FIG. 8 is a block diagram illustrating a signal reception apparatus using four transmission antennas and a rate having a value of 1 in a MIMO mobile communication system according to an embodiment of the present invention.

FIG. 8 is a block diagram illustrating a signal reception apparatus using four transmission antennas and a rate having a value of 1 in a MIMO mobile communication system according to an embodiment of the present invention.

Referring to FIG. 8, the signal reception apparatus includes reception antennas 811-1 and 811-2, a rearrangement unit 813, an STBC receiver 815, and a pre-processing matrix information generator 817.

A signal received through the reception antennas 811-1 and 811-2 is input to the rearrangement unit 813. The rearrangement unit 813 rearranges the signal received through the reception antennas 811-1 and 811-2 and then outputs the rearranged signal to the STBC receiver 815. Then, the STBC receiver 815 estimates the signal output from the rearrangement unit 813 as a transmission data stream $\hat{X}$ by using a maximum likelihood receiver based on a V-BLAST scheme, or a linear decoder based on an MMSE scheme or a ZF scheme. Further, the STBC receiver 815 performs channel estimation for the signal received through the reception antennas 811-1 and 811-2, and then outputs a result of the channel estimation to the pre-processing matrix information generator 817. The pre-processing matrix information generator 817 generates pre-processing matrix information in accordance with the channel estimation result, and then transmits the generated pre-processing matrix information to the signal transmission apparatus through a transmitter (not shown). The pre-processing matrix information is expressed by three bits and corresponds to one from among the indexes Ak as defined by equation (41).

Hereinafter, a structure of a signal transmission apparatus using three transmission antennas and a rate having a value of 2 in a MIMO mobile communication system according to an embodiment of the present invention will be described with reference to FIG. 9.

Figure 9:
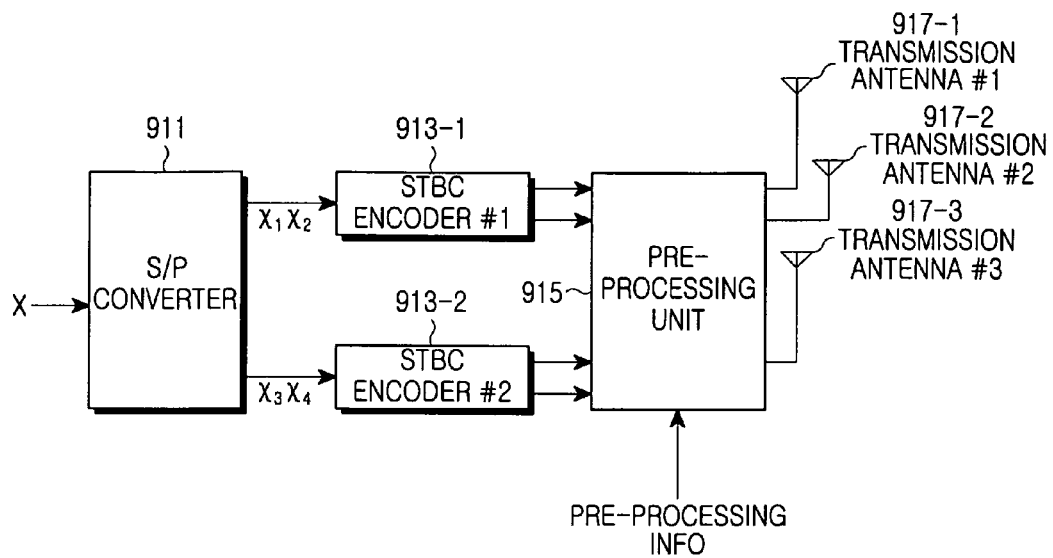
FIG. 9 is a block diagram illustrating a signal transmission apparatus using three transmission antennas and a rate having a value of 2 in a MIMO mobile communication system according to an embodiment of the present invention.

FIG. 9 is a block diagram illustrating a signal transmission apparatus using three transmission antennas and a rate having a value of 2 in a MIMO mobile communication system according to an embodiment of the present invention.

Referring to FIG. 9, the signal transmission apparatus includes an S/P converter 911, STBC encoders 913-1 and 913-2, a pre-processing unit 915, and transmission antennas 917-1, 917-2, and 917-3.

First, when a transmission data stream X to be transmitted occurs, the transmission data stream X is input to the S/P converter 911. The transmission data stream X is defined by $X=[X_1 X_2 X_3 X_4]^T$, and includes 24 (i.e., 4!) permutations.

Then, the S/P converter 911 rearranges the transmission data stream X by using a predetermined permutation as shown in equation (42) below, thereby generating a rearranged transmission data stream $\tilde{X}_1$, wherein i denotes a permutation index. That is, the permutation index i indicates an index of a corresponding permutation from among the 24 permutations included in the transmission data stream X $$\tilde{X}_i = [x_l x_m x_n x_o]^T$$

(42)

In equation (42), $l \neq m \neq n \neq o$, and $l, m, n, o \in \{1,2,3,4\}$.

The S/P converter 911 converts the transmission data stream $\tilde{X}_i$ into two parallel sub-transmission data streams, and then outputs the two generated sub-transmission data streams to corresponding STBC encoders.

The STBC encoders encode the input sub-transmission data streams according to the STBC scheme and then output the encoded sub-transmission data streams to the pre-processing unit 915, respectively. Then, the pre-processing unit 915 converts the signals output from the STBC encoders 913-1 and 913-2 into a serial signal, thereby generating a DSTTD symbol $S_i$ as defined by equation (43) below.

$$S_1 = \begin{bmatrix} x_1 & -x_2^* \\ x_2 & x_1^* \\ x_3 & -x_4^* \\ x_4 & x_3^* \end{bmatrix}, S_2 = \begin{bmatrix} x_1 & -x_3^* \\ x_3 & x_1^* \\ x_2 & -x_4^* \\ x_4 & x_2^* \end{bmatrix}, \ldots, S_{24} = \begin{bmatrix} x_4 & -x_3^* \\ x_3 & x_4^* \\ x_2 & -x_1^* \\ x_1 & x_2^* \end{bmatrix} \quad (43)$$

As noted from equation (43), 24 types of DSTTD symbols $S_i$ can be generated because 24 types of rearranged transmission data streams $\tilde{X}_1$ can be generated.

The final transmission symbol, which is transmitted through a corresponding transmission antenna by the pre-processing unit 915, can be defined by equation (44) below.

$$B_k S_1 = \qquad (44)$$
$$\left\{ \begin{bmatrix} x_1+x_4 & -x_2^*+x_3^* \\ x_2+x_3 & x_1^*-x_4^* \\ 0 & 0 \end{bmatrix}_{k=1}, \begin{bmatrix} x_1+x_4 & -x_2^*+x_3^* \\ 0 & 0 \\ x_2+x_3 & x_1^*-x_4^* \end{bmatrix}_{k=2}, \begin{bmatrix} 0 & 0 \\ x_1+x_4 & -x_2^*+x_3^* \\ x_2+x_3 & x_1^*-x_4^* \end{bmatrix}_{k=3} \right\}$$

In equation (44), $B_k$ corresponds to a pre-processing matrix $W_k$ in the case of using three transmission antennas and a rate having a value of 2 in a MIMO mobile communication system. Here, $B_k$ can be defined by equation (45) below, and the pre-processing matrix information indicating $B_k$ includes two bits.

$$B_k \in \left\{ \begin{bmatrix} 1 & 0 & 0 & 1 \\ 0 & 1 & 1 & 0 \\ 0 & 0 & 0 & 0 \end{bmatrix}_{k=1}, \begin{bmatrix} 1 & 0 & 0 & 1 \\ 0 & 0 & 0 & 0 \\ 0 & 1 & 1 & 0 \end{bmatrix}_{k=2}, \begin{bmatrix} 0 & 0 & 0 & 0 \\ 1 & 0 & 0 & 1 \\ 0 & 1 & 1 & 0 \end{bmatrix}_{k=3} \right\} \quad (45)$$

Each row of the pre-processing matrix $B_k$ defined by equation (45) is mapped to the transmission antenna index, and each column thereof is mapped to an input index of a pre-processing unit performing the pre-processing.

Next, a structure of a signal reception apparatus using three transmission antennas and a rate having a value of 2 in a MIMO mobile communication system according to an embodiment of the present invention will be described with reference to FIG. 10.

Figure 10:
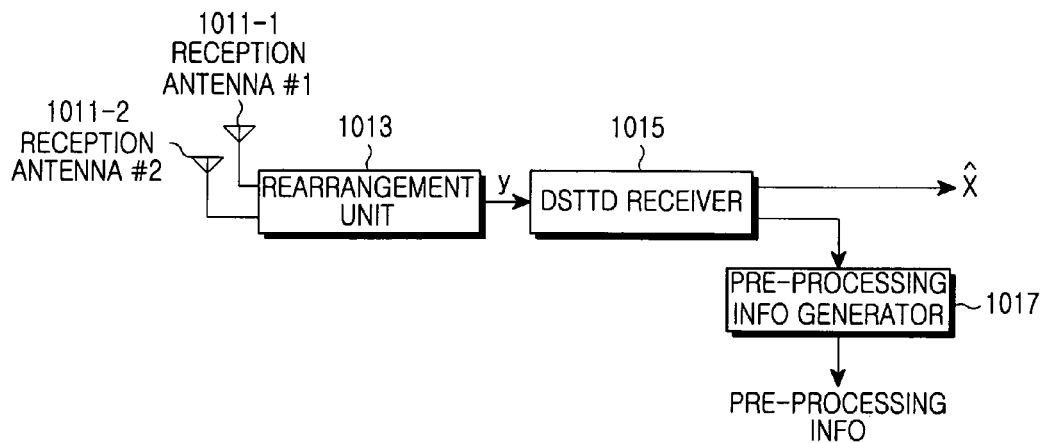
FIG. 10 is a block diagram illustrating a signal reception apparatus using three transmission antennas and a rate having a value of 2 in a MIMO mobile communication system according to an embodiment of the present invention.

FIG. 10 is a block diagram illustrating a signal reception apparatus using three transmission antennas and a rate having a value of 2 in a MIMO mobile communication system according to an embodiment of the present invention.

Referring to FIG. 10, the signal reception apparatus includes reception antennas 1011-1 and 1011-2, a rearrangement unit 1013, a DSTTD receiver 1015, and a pre-processing matrix information generator 1017.

A signal received through the reception antennas 1011-1 and 1011-2 is input to the rearrangement unit 1013. The rearrangement unit 1013 rearranges the signal received through the reception antennas 1011-1 and 1011-2 and then outputs the rearranged signal to the DSTTD receiver 1015. Then, the DSTTD receiver 1015 estimates the signal output from the rearrangement unit 1013 as a transmission data stream $\hat{X}$ by using a maximum likelihood receiver based on a V-BLAST scheme, or a linear decoder based on an MMSE scheme or a ZF scheme. Further, the DSTTD receiver 1015 performs channel estimation for the signal received through the reception antennas 1011-1 and 1011-2, and then outputs a result of the channel estimation to the pre-processing matrix information generator 1017. The pre-processing matrix information generator 1017 generates pre-processing matrix information in accordance with the channel estimation result, and then transmits the generated pre-processing matrix information to the signal transmission apparatus through a transmitter (not shown). The pre-processing matrix information generated by the pre-processing matrix information generator 1017 is expressed by two bits and corresponds to one from among the indexes $B_k$ as defined by equation (45).

Hereinafter, a structure of a signal transmission apparatus using three transmission antennas and a rate having a value of 1 in a MIMO mobile communication system according to an embodiment of the present invention will be described with reference to FIG. 11.

Figure 11:
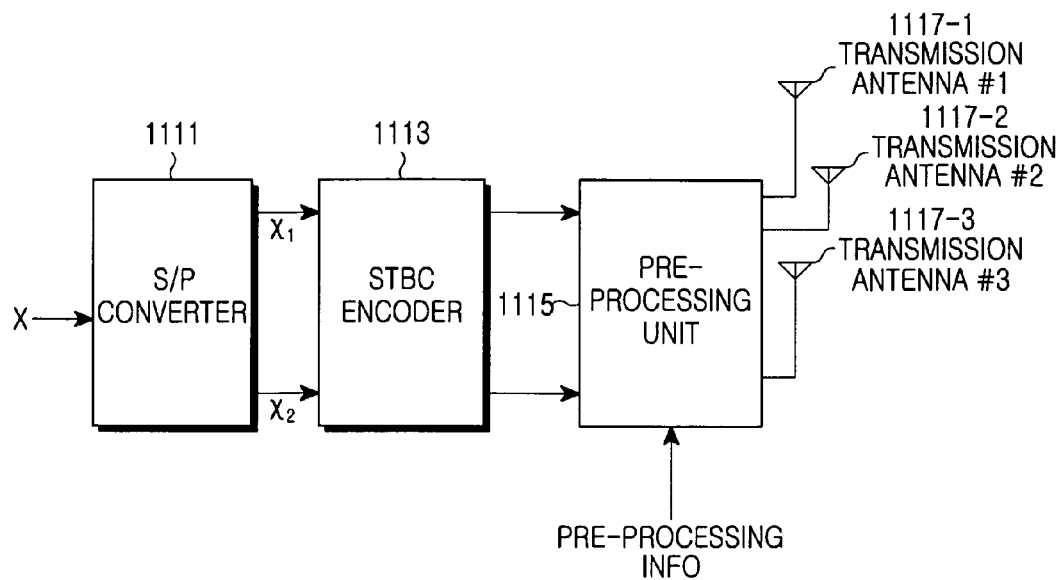
FIG. 11 is a block diagram illustrating a signal transmission apparatus using three transmission antennas and a rate having a value of 1 in a MIMO mobile communication system according to an embodiment of the present invention.

FIG. 11 is a block diagram illustrating a signal transmission apparatus using three transmission antennas and a rate having a value of 1 in a MIMO mobile communication system according to an embodiment of the present invention.

Referring to FIG. 11, the signal transmission apparatus includes an S/P converter 1111, an STBC encoder 1113, a pre-processing unit 1115, and transmission antennas 1117-1, 1117-2, and 1117-3.

First, when a transmission data stream X to be transmitted occurs, the transmission data stream X is input to the S/P converter 1111. The transmission data stream X is defined by $X=[X_1 X_2]^T$, and includes two (i.e., 2!) permutations.

Then, the S/P converter 1111 rearranges the transmission data stream X by using a predetermined permutation as shown in equation (46) below, thereby generating a rearranged transmission data stream $\tilde{X}_i$, wherein i denotes a permutation index. That is, the permutation index i indicates an index of a corresponding permutation from among the two permutations included in the transmission data stream X.

$$\tilde{X}_{i=[x_l x_m]^T} \quad (46)$$

In equation (46), $l \neq m$, and $l, m \in \{1,2\}$.

The S/P converter 1111 converts the rearranged transmission data stream $\tilde{X}_i$ into two parallel sub-transmission data streams, and then outputs the two generated sub-transmission data streams to the STBC encoder 1113. The STBC encoder 1113 encodes the input sub-transmission data streams according to the STBC scheme and then outputs the encoded sub-transmission data streams to the pre-processing unit 1115. Then, the pre-processing unit 1115 converts the signals output from the STBC encoder 1113 into a serial signal, thereby generating an STBC symbol $S_i$ as defined by equation (47) below.

The S/P converter 1111 converts the rearranged transmission data stream $\tilde{X}_i$ into two parallel sub-transmission data streams, and then outputs the two generated sub-transmission data streams to the STBC encoder 1113. The STBC encoder 1113 encodes the input sub-transmission data streams according to the STBC scheme and then outputs the encoded sub-transmission data streams to the pre-processing unit 1115. Then, the pre-processing unit 1115 converts the signals output from the STBC encoder 1113 into a serial signal, thereby generating an STBC symbol $S_i$ as defined by equation (47) below.

$$S_1 = \begin{bmatrix} x_1 & -x_2^* \\ x_2 & x_1^* \end{bmatrix}, S_2 = \begin{bmatrix} x_2 & -x_1^* \\ x_1 & x_2^* \end{bmatrix} \quad (47)$$

As noted from equation (47), it is possible to generate two types of DSTTD symbols $S_i$ because it is possible to generate two types of rearranged transmission data streams $\tilde{X}_i$.

Here, the final transmission symbol, which is transmitted through a corresponding transmission antenna by the pre-processing unit 1115, can be defined by equation (48) below.

$$C_k S_1 = \left\{ \begin{bmatrix} x_1 & -x_2^* \\ x_2 & x_1^* \\ 0 & 0 \end{bmatrix}_{k=1}, \begin{bmatrix} x_1 & -x_2^* \\ 0 & 0 \\ x_2 & x_1^* \end{bmatrix}_{k=2}, \begin{bmatrix} 0 & 0 \\ x_1 & -x_2^* \\ x_2 & x_1^* \end{bmatrix}_{k=3} \right\} \quad (48)$$

or $$C_k S_2 = \left\{ \begin{bmatrix} x_2 & -x_1^* \\ x_1 & x_2^* \\ 0 & 0 \end{bmatrix}_{k=1}, \begin{bmatrix} x_2 & -x_1^* \\ 0 & 0 \\ x_1 & x_2^* \end{bmatrix}_{k=2}, \begin{bmatrix} 0 & 0 \\ x_2 & -x_1^* \\ x_1 & x_2^* \end{bmatrix}_{k=3} \right\}$$

In equation (48), $C_k$ corresponds to a pre-processing matrix $W_k$ in the case of using three transmission antennas and a rate having a value of 1 in a MIMO mobile communication system. Here, $C_k$ can be defined by equation (49) below, pre-processing matrix information indicating $C_k$ includes two bits.

$$C_k \in \left\{ \begin{bmatrix} 1 & 0 \\ 0 & 1 \\ 0 & 0 \end{bmatrix}_{k=1}, \begin{bmatrix} 1 & 0 \\ 0 & 0 \\ 0 & 1 \end{bmatrix}_{k=2}, \begin{bmatrix} 0 & 0 \\ 1 & 0 \\ 0 & 1 \end{bmatrix}_{k=3} \right\} \quad (49)$$

Each row of the pre-processing matrix $C_k$ defined by equation (49) is mapped to a transmission antenna index, and each column thereof is mapped to an input index of a pre-processing unit performing the pre-processing.

Next, a structure of a signal reception apparatus using three transmission antennas and a rate having a value of 1 in a MIMO mobile communication system according to an embodiment of the present invention will be described with reference to FIG. 12.

Figure 12:
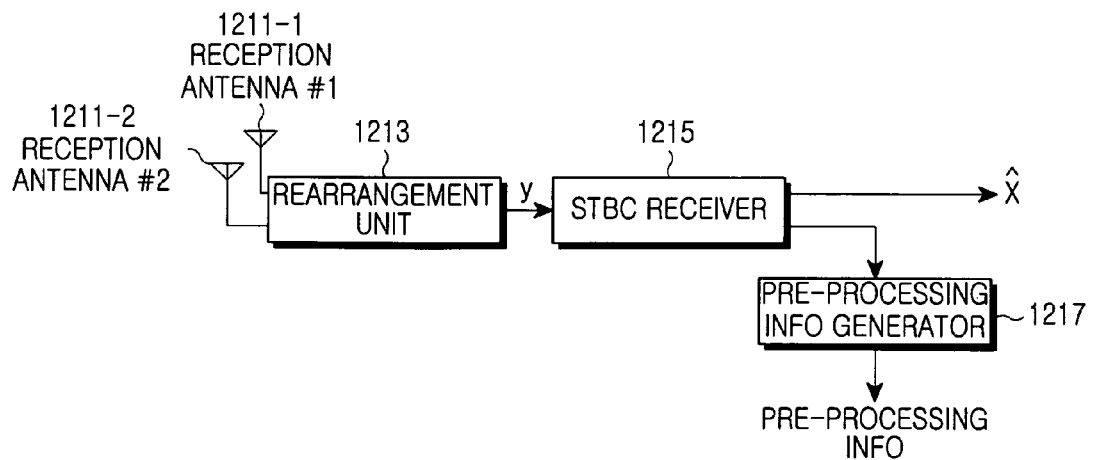
FIG. 12 is a block diagram illustrating a signal reception apparatus using three transmission antennas and a rate having a value of 1 in a MIMO mobile communication system according to an embodiment of the present invention.

FIG. 12 is a block diagram illustrating a signal reception apparatus using three transmission antennas and a rate having a value of 1 in a MIMO mobile communication system according to an embodiment of the present invention.

Referring to FIG. 12, the signal reception apparatus includes reception antennas 1211-1 and 1211-2, a rearrangement unit 1213, an STBC receiver 1215, and a pre-processing matrix information generator 1217.

A signal received through the reception antennas 1211-1 and 1211-2 is input to the rearrangement unit 1213. The rearrangement unit 1213 rearranges the signal received through the reception antennas 1211-1 and 1211-2 and then outputs the rearranged signal to the STBC receiver 1215. Then, the STBC receiver 1215 estimates the signal output from the rearrangement unit 1213 as a transmission data stream $\hat{X}$ by using a maximum likelihood receiver based on a V-BLAST scheme, or a linear decoder based on an MMSE scheme or a ZF scheme. Further, the STBC receiver 1215 performs channel estimation for the signal received through the reception antennas 1211-1 and 1211-2, and then outputs a result of the channel estimation to the pre-processing matrix information generator 1217. The pre-processing matrix information generator 1217 generates pre-processing matrix information in accordance with the channel estimation result, and then transmits the generated pre-processing matrix information to the signal transmission apparatus through a transmitter (not shown). The pre-processing matrix information is expressed by two bits and corresponds to one from among the indexes $C_k$ as defined by equation (49).

According to the present invention as described above, a signal is transmitted by using a pre-processing scheme in a MIMO mobile communication system, thereby overcoming the problem of spatial correlation between transmission antennas. Further, the present invention minimizes the number of bits included in pre-processing information used for pre-processing in a MIMO mobile communication system, thereby minimizing the entire overhead of the system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting a signal by a signal transmission apparatus in a Multiple Input Multiple Output (MIMO) mobile communication system, the method comprising the steps of:

inputting a symbol; and pre-processing the input symbol according to a pre-processing matrix corresponding to pre-processing matrix information and transmitting the pre-processed symbol through a corresponding transmission antenna, wherein the pre-processing matrix is determined in accordance with a number of transmission antennas and a rate used in the MIMO mobile communication system, and wherein, when the rate is 2, the number of the transmission antennas is 4, and the pre-processing matrix information includes two bits, the pre-processing matrix corresponds to one from among pre-processing matrixes defined by, $$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32} \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34} \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35} \begin{bmatrix} 1 & 0 & 0 & 1 \\ 0 & 1 & 1 & 0 \\ 0 & 0 & 0 & 0 \\ 0 & 0 & 0 & 0 \end{bmatrix}_{k=31} \right\},$$

$$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32} \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34} \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35} \begin{bmatrix} 0 & 0 & 0 & 0 \\ 1 & 0 & 0 & 1 \\ 0 & 1 & 1 & 0 \\ 0 & 0 & 0 & 0 \end{bmatrix}_{k=33} \right\},$$

and $$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32} \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34} \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35} \begin{bmatrix} 0 & 0 & 0 & 0 \\ 0 & 0 & 0 & 0 \\ 1 & 0 & 0 & 1 \\ 0 & 1 & 1 & 0 \end{bmatrix}_{k=36} \right\},$$

wherein $W_k$ indicates the pre-processing matrix, k indicates a pre-processing matrix index, each row of each pre-processing matrix $W_k$ is mapped to a transmission antenna index, and each column thereof is mapped to an input index of a pre-processing unit performing the pre-processing, and wherein, when the input symbol is defined by $$S_i = \begin{bmatrix} x_l & -x_m^* \\ x_m & x_l^* \\ x_n & -x_o^* \\ x_o & x_n^* \end{bmatrix},$$

a final transmission symbol transmitted through a corresponding transmission antenna corresponds to one from among transmission symbols defined by $$W_k S_i = \left\{ \begin{bmatrix} x_l+x_o & -x_m^*+x_n^* \\ 0 & 0 \\ x_m+x_n & x_l^*-x_o^* \\ 0 & 0 \end{bmatrix}_{k=32}, \begin{bmatrix} x_l+x_o & -x_m^*+x_n^* \\ 0 & 0 \\ 0 & 0 \\ x_m+x_n & x_l^*-x_o^* \end{bmatrix}_{k=34}, \right.$$

$$\begin{bmatrix} 0 & 0 \\ x_l+x_o & -x_m^*+x_n^* \\ 0 & 0 \\ x_m+x_n & x_l^*-x_o^* \end{bmatrix}_{k=35}, \begin{bmatrix} x_l+x_o & -x_m^*+x_n^* \\ x_m+x_n & x_l^*-x_o^* \\ 0 & 0 \\ 0 & 0 \end{bmatrix}_{k=31} \Big\},$$

$$W_k S_i = \left\{ \begin{bmatrix} x_l+x_o & -x_m^*+x_n^* \\ 0 & 0 \\ x_m+x_n & x_l^*-x_o^* \\ 0 & 0 \end{bmatrix}_{k=32}, \begin{bmatrix} x_l+x_o & -x_m^*+x_n^* \\ 0 & 0 \\ 0 & 0 \\ x_m+x_n & x_l^*-x_o^* \end{bmatrix}_{k=34}, \right.$$

$$\begin{bmatrix} 0 & 0 \\ x_l+x_o & -x_m^*+x_n^* \\ 0 & 0 \\ x_m+x_n & x_l^*-x_o^* \end{bmatrix}_{k=35}, \begin{bmatrix} 0 & 0 \\ x_l+x_0 & -x_m^*+x_n^* \\ x_m+x_n & x_l^*-x_o^* \\ 0 & 0 \end{bmatrix}_{k=33} \Big\},$$

and $$W_k S_i = \left\{ \begin{bmatrix} x_l+x_o & -x_m^*+x_n^* \\ 0 & 0 \\ x_m+x_n & x_l^*-x_o^* \\ 0 & 0 \end{bmatrix}_{k=32}, \begin{bmatrix} x_l+x_o & -x_m^*+x_n^* \\ 0 & 0 \\ 0 & 0 \\ x_m+x_n & x_l^*-x_o^* \end{bmatrix}_{k=34}, \right.$$

$$\begin{bmatrix} 0 & 0 \\ x_l+x_o & -x_m^*+x_n^* \\ 0 & 0 \\ x_m+x_n & x_l^*-x_o^* \end{bmatrix}_{k=35}, \begin{bmatrix} 0 & 0 \\ 0 & 0 \\ x_l+x_o & -x_m^*+x_n^* \\ x_m+x_n & x_l^*-x_o^* \end{bmatrix}_{k=36} \Big\},$$

wherein $S_i$ indicates the input symbol, $l \neq m \neq n \neq o$, $l,m,n,o \in \{1,2,3,4\}$, each row of the input symbol $S_i$ is mapped to an input index of the pre-processing unit, and each column thereof is mapped to a symbol index or another sub-carrier of the same symbol, and each row of the final transmission symbol $W_k S_i$ is mapped to a transmission antenna index, and each column thereof is mapped to the symbol index or another sub-carrier of the same symbol.

2. The method of claim 1, wherein the pre-processing matrix information is received from a signal reception apparatus corresponding to the signal transmission apparatus.

3. A method for receiving a signal by a signal reception apparatus in a Multiple Input Multiple Output (MIMO) mobile communication system, the method comprising the steps of:

performing channel estimation for an incoming signal; and generating pre-processing matrix information that indicates information on a pre-processing matrix to be used by a signal transmission apparatus corresponding to the signal reception apparatus in accordance with a result of the channel estimation, wherein the pre-processing matrix is determined in accordance with a number of transmission antennas and a rate used in the MIMO mobile communication system, and wherein, when the rate is 2, the number of the transmission antennas is 4, and the pre-processing matrix information includes two bits, the pre-processing matrix corresponds to one from among pre-processing matrixes defined by $$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32}, \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34}, \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35}, \begin{bmatrix} 1 & 0 & 0 & 1 \\ 0 & 1 & 1 & 0 \\ 0 & 0 & 0 & 0 \\ 0 & 0 & 0 & 0 \end{bmatrix}_{k=31} \right\},$$

$$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32}, \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34}, \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35}, \begin{bmatrix} 0 & 0 & 0 & 0 \\ 1 & 0 & 0 & 1 \\ 0 & 1 & 1 & 0 \\ 0 & 0 & 0 & 0 \end{bmatrix}_{k=33} \right\}, \text{ and }$$

$$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32}, \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34}, \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35}, \begin{bmatrix} 0 & 0 & 0 & 0 \\ 0 & 0 & 0 & 0 \\ 1 & 0 & 0 & 1 \\ 0 & 1 & 1 & 0 \end{bmatrix}_{k=36} \right\},$$

wherein $W_k$ indicates the pre-processing matrix, k indicates a pre-processing matrix index, each row of each pre-processing matrix $W_k$ is mapped to a transmission antenna index, and each column thereof is mapped to an input index of a pre-processing unit performing the pre-processing, and wherein, when the input symbol is defined by $$S_i = \begin{bmatrix} x_l & -x_m^* \\ x_m & x_l^* \\ x_n & -x_o^* \\ x_o & x_n^* \end{bmatrix},$$

a final transmission symbol transmitted through a corresponding transmission antenna corresponds to one from among transmission symbols defined by $$W_k S_i = \left\{ \begin{bmatrix} x_l+x_o & -x_m^*+x_n^* \\ 0 & 0 \\ x_m+x_n & x_l^*-x_o^* \\ 0 & 0 \end{bmatrix}_{k=32}, \right.$$

$$\begin{bmatrix} x_l+x_o & -x_m^*+x_n^* \\ 0 & 0 \\ 0 & 0 \\ x_m+x_n & x_l^*-x_o^* \end{bmatrix}_{k=34}, \begin{bmatrix} 0 & 0 \\ x_l+x_o & -x_m^*+x_n^* \\ 0 & 0 \\ x_m+x_n & x_l^*-x_o^* \end{bmatrix}_{k=35}, \begin{bmatrix} x_l+x_o & -x_m^*+x_n^* \\ x_m+x_n & x_l^*-x_o^* \\ 0 & 0 \\ 0 & 0 \end{bmatrix}_{k=31} \Big\},$$

-continued $$W_k S_i = \left\{ \begin{bmatrix} x_l+x_o & -x_m^*+x_n^* \\ 0 & 0 \\ x_m+x_n & x_l^*-x_o^* \\ 0 & 0 \end{bmatrix}_{k=32}, \begin{bmatrix} x_l+x_o & -x_m^*+x_n^* \\ 0 & 0 \\ 0 & 0 \\ x_m+x_n & x_l^*-x_o^* \end{bmatrix}_{k=34}, \right.$$

$$\begin{bmatrix} 0 & 0 \\ x_l+x_o & -x_m^*+x_n^* \\ 0 & 0 \\ x_m+x_n & x_l^*-x_o^* \end{bmatrix}_{k=35}, \begin{bmatrix} 0 & 0 \\ x_l+x_o & -x_m^*+x_n^* \\ x_m+x_n & x_l^*-x_o^* \\ 0 & 0 \end{bmatrix}_{k=33} \right\}, \text{ and}$$

$$W_k S_i = \left\{ \begin{bmatrix} x_l+x_o & -x_m^*+x_n^* \\ 0 & 0 \\ x_m+x_n & x_l^*-x_o^* \\ 0 & 0 \end{bmatrix}_{k=32}, \begin{bmatrix} x_l+x_o & -x_m^*+x_n^* \\ 0 & 0 \\ 0 & 0 \\ x_m+x_n & x_l^*-x_o^* \end{bmatrix}_{k=34}, \right.$$

$$\begin{bmatrix} 0 & 0 \\ x_l+x_o & -x_m^*+x_n^* \\ 0 & 0 \\ x_m+x_n & x_l^*-x_o^* \end{bmatrix}_{k=35}, \begin{bmatrix} 0 & 0 \\ 0 & 0 \\ x_l+x_o & -x_m^*+x_n^* \\ x_m+x_n & x_l^*-x_o^* \end{bmatrix}_{k=36} \right\}$$

wherein $S_i$ indicates the input symbol, $l \neq m \neq n \neq o$, $l,m,n,o \in \{1,2,3,4\}$, each row of the input symbol $S_i$ is ma sed to an input index of the pre-processing unit, and each column thereof is mapped to a symbol index or another sub-carrier of the same symbol, and each row of the final transmission symbol $W_k S_i$ is mapped to a transmission antenna index, and each column thereof is mapped to the symbol index or another sub-carrier of the same symbol.

4. The method of claim 3, further comprising a step of transmitting the pre-processing matrix information to the signal transmission apparatus.

5. A signal transmission apparatus of a Multiple Input Multiple Output (MIMO) mobile communication system, the signal transmission apparatus comprising:

transmission antennas; and a pre-processing unit for pre-processing an input symbol according to a pre-processing matrix corresponding to pre-processing matrix information and transmitting the pre-processed symbol through a corresponding transmission antenna, wherein the pre-processing matrix is determined in accordance with a number of the transmission antennas and a rate used in the MIMO mobile communication system, and wherein, when the rate is 2, the number of the transmission antennas is 4, and the pre-processing matrix information includes two bits, the pre-processing matrix corresponds to one from among pre-processing matrixes defined by $$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32} \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34} \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35} \begin{bmatrix} 1 & 0 & 0 & 1 \\ 0 & 1 & 1 & 0 \\ 0 & 0 & 0 & 0 \\ 0 & 0 & 0 & 0 \end{bmatrix}_{k=31} \right\},$$

$$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32} \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34} \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35} \begin{bmatrix} 0 & 0 & 0 & 0 \\ 1 & 0 & 0 & 1 \\ 0 & 1 & 1 & 0 \\ 0 & 0 & 0 & 0 \end{bmatrix}_{k=33} \right\},$$

and $$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32} \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34} \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35} \begin{bmatrix} 0 & 0 & 0 & 0 \\ 0 & 0 & 0 & 0 \\ 1 & 0 & 0 & 1 \\ 0 & 1 & 1 & 0 \end{bmatrix}_{k=36} \right\},$$

wherein $W_k$ indicates the pre-processing matrix, k indicates a pre-processing matrix index, each row of each pre-processing matrix $W_k$ is mapped to a transmission antenna index and each column thereof is mapped to an input index of a pre-processing unit performing the pre-processing, and wherein, when the input symbol is defined by $$S_i = \begin{bmatrix} x_l & -x_m^* \\ x_m & x_l^* \\ x_n & -x_o^* \\ x_o & x_n^* \end{bmatrix},$$

a final transmission symbol transmitted through a corresponding transmission antenna corresponds to one from among transmission symbols defined by $$W_k S_i = \left\{ \begin{bmatrix} x_l+x_o & -x_m^*+x_n^* \\ 0 & 0 \\ x_m+x_n & x_l^*-x_o^* \\ 0 & 0 \end{bmatrix}_{k=32}, \right.$$

$$\begin{bmatrix} x_l+x_o & -x_m^*+x_n^* \\ 0 & 0 \\ 0 & 0 \\ x_m+x_n & x_l^*-x_o^* \end{bmatrix}_{k=34}, \begin{bmatrix} 0 & 0 \\ x_l+x_o & -x_m^*+x_n^* \\ 0 & 0 \\ x_m+x_n & x_l^*-x_o^* \end{bmatrix}_{k=35}, \begin{bmatrix} x_l+x_o & -x_m^*+x_n^* \\ x_m+x_n & x_l^*-x_o^* \\ 0 & 0 \\ 0 & 0 \end{bmatrix}_{k=31} \right\},$$

$$W_k S_i = \left\{ \begin{bmatrix} x_l+x_o & -x_m^*+x_n^* \\ 0 & 0 \\ x_m+x_n & x_l^*-x_o^* \\ 0 & 0 \end{bmatrix}_{k=32}, \begin{bmatrix} x_l+x_o & -x_m^*+x_n^* \\ 0 & 0 \\ 0 & 0 \\ x_m+x_n & x_l^*-x_o^* \end{bmatrix}_{k=34}, \right.$$

$$\begin{bmatrix} 0 & 0 \\ x_l+x_o & -x_m^*+x_n^* \\ 0 & 0 \\ x_m+x_n & x_l^*-x_o^* \end{bmatrix}_{k=35}, \begin{bmatrix} 0 & 0 \\ x_l+x_o & -x_m^*+x_n^* \\ x_m+x_n & x_l^*-x_o^* \\ 0 & 0 \end{bmatrix}_{k=33} \right\},$$

and

-continued $$W_k S_i = \left\{ \begin{bmatrix} x_l+x_o & -x_m^*+x_n^* \\ 0 & 0 \\ x_m+x_n & x_l^*-x_o^* \\ 0 & 0 \end{bmatrix}_{k=32}, \begin{bmatrix} x_l+x_o & -x_m^*+x_n^* \\ 0 & 0 \\ 0 & 0 \\ x_m+x_n & x_l^*-x_o^* \end{bmatrix}_{k=34}, \right.$$

$$\left. \begin{bmatrix} 0 & 0 \\ x_l+x_o & -x_m^*+x_n^* \\ 0 & 0 \\ x_m+x_n & x_l^*-x_o^* \end{bmatrix}_{k=35}, \begin{bmatrix} 0 & 0 \\ 0 & 0 \\ x_l+x_o & -x_m^*+x_n^* \\ x_m+x_n & x_l^*-x_o^* \end{bmatrix}_{k=36} \right\},$$

wherein $S_i$ indicates the input symbol, $l \neq m \neq n \neq o$, $l,m,n,o \in \{1,2,3,4\}$, each row of the input symbol $S_i$ is mapped to an input index of the pre-processing unit, and each column thereof is mapped to a symbol index or another sub-carrier of the same symbol, and each row of the final transmission symbol $W_k S_i$ is mapped to a transmission antenna index, and each column thereof is mapped to the symbol index or another sub-carrier of the same symbol.

6. The signal transmission apparatus of claim 5, further comprising a receiver for receiving the pre-processing matrix information from a signal reception apparatus corresponding to the signal transmission apparatus.

7. A signal reception apparatus of a Multiple Input Multiple Output (MIMO) mobile communication system, the signal reception apparatus comprising:

a pre-processing information generator for generating pre-processing matrix information that indicates information on a pre-processing matrix to be used by a signal transmission apparatus corresponding to the signal reception apparatus in accordance with a result of channel estimation for an incoming signal, wherein the pre-processing matrix is determined in accordance with a number of transmission antennas and a rate used in the MIMO mobile communication system, and wherein, when the rate is 2, the number of the transmission antennas is 4, and the pre-processing matrix information includes two bits, the pre-processing matrix corresponds to one from among pre-processing matrixes defined by $$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32} \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34} \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35} \begin{bmatrix} 1 & 0 & 0 & 1 \\ 0 & 1 & 1 & 0 \\ 0 & 0 & 0 & 0 \\ 0 & 0 & 0 & 0 \end{bmatrix}_{k=31} \right\},$$

$$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32} \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34} \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35} \begin{bmatrix} 0 & 0 & 0 & 0 \\ 1 & 0 & 0 & 1 \\ 0 & 1 & 1 & 0 \\ 0 & 0 & 0 & 0 \end{bmatrix}_{k=33} \right\},$$

and $$W_k = \left\{ \begin{bmatrix} 1 & 0 & 0 & 1 \\ 0 & 0 & 0 & 0 \\ 0 & 1 & 1 & 0 \\ 0 & 0 & 0 & 0 \end{bmatrix}_{k=32} \begin{bmatrix} 1 & 0 & 0 & 1 \\ 0 & 0 & 0 & 0 \\ 0 & 0 & 0 & 0 \\ 0 & 1 & 1 & 0 \end{bmatrix}_{k=34} \begin{bmatrix} 0 & 0 & 0 & 0 \\ 1 & 0 & 0 & 1 \\ 0 & 0 & 0 & 0 \\ 0 & 1 & 1 & 0 \end{bmatrix}_{k=35} \begin{bmatrix} 0 & 0 & 0 & 0 \\ 0 & 0 & 0 & 0 \\ 1 & 0 & 0 & 1 \\ 0 & 1 & 1 & 0 \end{bmatrix}_{k=36} \right\},$$

wherein $W_k$ indicates the pre-processing matrix, k indicates a pre-processing matrix index, each row of each pre-processing matrix $W_k$ is mapped to a transmission antenna index and each column thereof is mapped to an input index of a pre-processing unit performing the pre-processing, and wherein, when the input symbol is defined by $$S_i = \begin{bmatrix} x_l & -x_m^* \\ x_m & x_l^* \\ x_n & -x_o^* \\ x_o & x_n^* \end{bmatrix},$$

a final transmission symbol transmitted through a corresponding transmission antenna corresponds to one from among transmission symbols defined by $$W_k S_i = \left\{ \begin{bmatrix} x_l+x_o & -x_m^*+x_n^* \\ 0 & 0 \\ x_m+x_n & x_l^*-x_o^* \\ 0 & 0 \end{bmatrix}_{k=32}, \begin{bmatrix} x_l+x_o & -x_m^*+x_n^* \\ 0 & 0 \\ 0 & 0 \\ x_m+x_n & x_l^*-x_o^* \end{bmatrix}_{k=34}, \right.$$

$$\left. \begin{bmatrix} 0 & 0 \\ x_l+x_o & -x_m^*+x_n^* \\ 0 & 0 \\ x_m+x_n & x_l^*-x_o^* \end{bmatrix}_{k=35}, \begin{bmatrix} x_l+x_o & -x_m^*+x_n^* \\ x_m+x_n & x_l^*-x_o^* \\ 0 & 0 \\ 0 & 0 \end{bmatrix}_{k=31} \right\},$$

$$W_k S_i = \left\{ \begin{bmatrix} x_l+x_o & -x_m^*+x_n^* \\ 0 & 0 \\ x_m+x_n & x_l^*-x_o^* \\ 0 & 0 \end{bmatrix}_{k=32}, \begin{bmatrix} x_l+x_o & -x_m^*+x_n^* \\ 0 & 0 \\ 0 & 0 \\ x_m+x_n & x_l^*-x_o^* \end{bmatrix}_{k=34}, \right.$$

$$\left. \begin{bmatrix} 0 & 0 \\ x_l+x_o & -x_m^*+x_n^* \\ 0 & 0 \\ x_m+x_n & x_l^*-x_o^* \end{bmatrix}_{k=35}, \begin{bmatrix} 0 & 0 \\ x_l+x_o & -x_m^*+x_n^* \\ x_m+x_n & x_l^*-x_o^* \\ 0 & 0 \end{bmatrix}_{k=33} \right\}, \text{ and}$$

$$W_k S_i = \left\{ \begin{bmatrix} x_l+x_o & -x_m^*+x_n^* \\ 0 & 0 \\ x_m+x_n & x_l^*-x_o^* \\ 0 & 0 \end{bmatrix}_{k=32}, \begin{bmatrix} x_l+x_o & -x_m^*+x_n^* \\ 0 & 0 \\ 0 & 0 \\ x_m+x_n & x_l^*-x_o^* \end{bmatrix}_{k=34}, \right.$$

$$\left. \begin{bmatrix} 0 & 0 \\ x_l+x_o & -x_m^*+x_n^* \\ 0 & 0 \\ x_m+x_n & x_l^*-x_o^* \end{bmatrix}_{k=35}, \begin{bmatrix} 0 & 0 \\ 0 & 0 \\ x_l+x_o & -x_m^*+x_n^* \\ x_m+x_n & x_l^*-x_o^* \end{bmatrix}_{k=36} \right\},$$

wherein $S_i$ indicates the input symbol, $l \neq m \neq n \neq o$, $l,m,n,o \in \{1,2,3,4\}$, each row of the input symbol $S_i$ is mapped to an input index of the pre-processing unit, and each column thereof is mapped to a symbol index or another sub-carrier of the same symbol, and each row of the final transmission symbol $W_k S_i$ is mapped to a transmission antenna index, and each column thereof is mapped to the symbol index or another sub-carrier of the same symbol.

8. The signal reception apparatus of claim 7, further comprising a transmitter for transmitting the pre-processing matrix information to the signal transmission apparatus.

* * * * *